(12) United States Patent
Pfeifer et al.

(10) Patent No.: US 12,299,144 B2
(45) Date of Patent: *May 13, 2025

(54) SYNCHRONIZATION OF DIGITAL RIGHTS MANAGEMENT DATA

(71) Applicant: Comcast Cable Communications, LLC, Philadelphia, PA (US)

(72) Inventors: Jeremy Phillip Pfeifer, Highlands Ranch, CO (US); Garey L. Hassler, Castle Pines, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/538,809

(22) Filed: Dec. 13, 2023

(65) Prior Publication Data

US 2024/0265117 A1    Aug. 8, 2024

Related U.S. Application Data

(63) Continuation of application No. 17/138,188, filed on Dec. 30, 2020, now Pat. No. 11,893,090.

(51) Int. Cl.
*G06F 21/60* (2013.01)
*G06F 21/10* (2013.01)

(52) U.S. Cl.
CPC .......... *G06F 21/602* (2013.01); *G06F 21/10* (2013.01)

(58) Field of Classification Search
CPC .............................. G06F 21/602; G06F 21/10
See application file for complete search history.

(56) References Cited

U.S. PATENT DOCUMENTS

| | | | |
|---|---|---|---|
| 10,019,591 B1 | 7/2018 | Beguin | |
| 2003/0004998 A1* | 1/2003 | Datta | G06F 16/9574 715/234 |

(Continued)

FOREIGN PATENT DOCUMENTS

WO    2016053184 A1    4/2016

OTHER PUBLICATIONS

U.S. Appl. No. 17/138,188 (2022/0207114), filed Dec. 30, 2020 (Jun. 30, 2022), Jeremy Phillip Pfeider (Comcast Cable Communications, LLC).

*Primary Examiner* — Abiy Getachew
(74) *Attorney, Agent, or Firm* — Ballard Spahr LLP

(57) ABSTRACT

A computing device (e.g., a content packager) may receive a request for content (e.g., video, audio, games, applications, data). The computing device may send a second request for the requested content to an encoder. In response to the second request, the computing device (e.g., the content packager) may receive the requested content and a content manifest associated with the requested content. The computing device may determine that encryption key data (e.g., an encryption key and/or key metadata) for the requested content is not in a cache associated with the computing device. The computing device (e.g., the content packager or a cache associated with the content packager) may send a request for the encryption key data associated with the requested content to a cache associated with a second computing device, based on the determination that the encryption key data is not in the cache associated with the computing device.

30 Claims, 8 Drawing Sheets

(56) References Cited

U.S. PATENT DOCUMENTS

| | | | |
|---|---|---|---|
| 2005/0188048 A1* | 8/2005 | Yuan | G06F 16/9574 |
| | | | 709/208 |
| 2014/0115245 A1* | 4/2014 | Maybee | G06F 12/126 |
| | | | 711/E12.024 |
| 2015/0149771 A1 | 5/2015 | Yen et al. | |
| 2018/0307848 A1* | 10/2018 | Leiseboer | G06F 21/78 |

* cited by examiner

SYNCHRONIZATION OF DIGITAL RIGHTS MANAGEMENT DATA

CROSS REFERENCE TO RELATED APPLICATION

This application claims priority under 35 U.S.C. § 120 to, and is a continuation of, U.S. patent application Ser. No. 17/138,188, filed Dec. 30, 2020, the entire contents of which is hereby incorporated herein by reference in its entirety for all purposes.

BACKGROUND

Content (e.g., video, audio, games, applications, data) may be provided to users in a variety of ways. In order to protect the content prior to distribution to a user device, the content may be encrypted. The protection and transmission of the encryption key data is broadly called Digital Rights Management (DRM), and there are several competing DRM schemes. While each DRM scheme may use different formats and protocols, the end goal is the same, protecting the encryption key from unauthorized access. Key metadata may be included with the encryption key and may be used to help decrypt the encrypted content.

To help prevent outages, duplicate streams of the content are often packaged in separate data centers. When a component fails at one datacenter, a switch may be made to the other data center to provide all or the remainder of the content to the user device. If the encryption key and/or the key metadata from the data centers are different from one another, it may cause issues with displaying the content at the user device.

SUMMARY

It is to be understood that both the following general description and the following detailed description are exemplary and explanatory only and are not restrictive. Methods and systems for synchronization of digital rights management data are described.

A computing device (e.g., a packager) may receive a request for content from a user device via a network. The request for content may include a content identifier identifying the content and a segment identifier or clock identifying the segment or portion of the content being requested. The computing device (e.g., the packager) may send a request to an encoder requesting the content. The content may be received by the computing device from the encoder. The content may be in an unencrypted format. The computing device may also receive a manifest file associated with the content from the encoder.

The computing device (e.g., the packager) may check or otherwise send a request to a storage device (e.g., a cache) local to or part of the computing device to determine if the computing device has a copy of encryption key data (e.g., an encryption key and/or key metadata) for encrypting the requested content. The computing device may determine or receive a response from the storage device indicating that the encryption key data for the requested content is not available. The computing device may send a request to another computing device (e.g., a second packager or storage device associated with the second packager) requesting a copy of encryption key data (e.g., an encryption key and/or key metadata) for encrypting the requested content.

If the second computing device has a copy of the requested encryption key data, the computing device (e.g., the packager or the cache) may receive the requested encryption key data from the second computing device (e.g., the second packager or second cache or another storage device associated with the second packager). The computing device may store the received copy of the encryption key data in the storage device (e.g., cache). The computing device may modify the manifest file received from the encoder to include at least a portion of the encryption key data (e.g., all or a portion of the key metadata). The computing device may send the content and the modified manifest file to the user device for display of the requested content.

If the second computing device does not have a copy of the requested encryption key data, the second computing device (e.g., the second packager) may send a request for the encryption key data to a keystore (e.g., or other form of storage device wherein encryption keys, encryption tokens, and/or key metadata associated with the requested content may be stored). The second computing device (e.g., the second packager) may receive the requested encryption key data from the keystore and may store the encryption key data in the second storage device (e.g., second cache or another storage device associated with the second packager). The second computing device (e.g., the second packager or second cache) may send the encryption key data to the computing device (e.g., the packager or the cache). The first computing device may receive the requested encryption key data and may store it in the cache (e.g., or another storage device associated with the packager). The computing device may modify the manifest file received from the encoder to include at least a portion of the encryption key data (e.g., all or a portion of the key metadata). The computing device may send the content and the modified manifest file to the user device for display of the requested content.

If the second computing device does not have a copy of the requested encryption key data, the second computing device (e.g., the second packager or second cache) may send a response to the computing device (e.g., the packager or the cache) indicating that the second computing device does not have the requested encryption key data. The computing device may receive the response and send a request for the encryption key data to a keystore (e.g., or other form of storage device wherein encryption keys, encryption tokens, and/or key metadata associated with the requested content may be stored). The computing device (e.g., the packager or cache) may receive the requested encryption key data from the keystore and may store the encryption key data in the cache (e.g., or another storage device associated with the packager). The computing device may modify the manifest file received from the encoder to include at least a portion of the encryption key data (e.g., all or a portion of the key metadata). The computing device may send the content and the modified manifest file to the user device for display of the requested content.

This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of the present description serve to explain the principles of the apparatuses and systems described herein.

DETAILED DESCRIPTION

Figure 1:
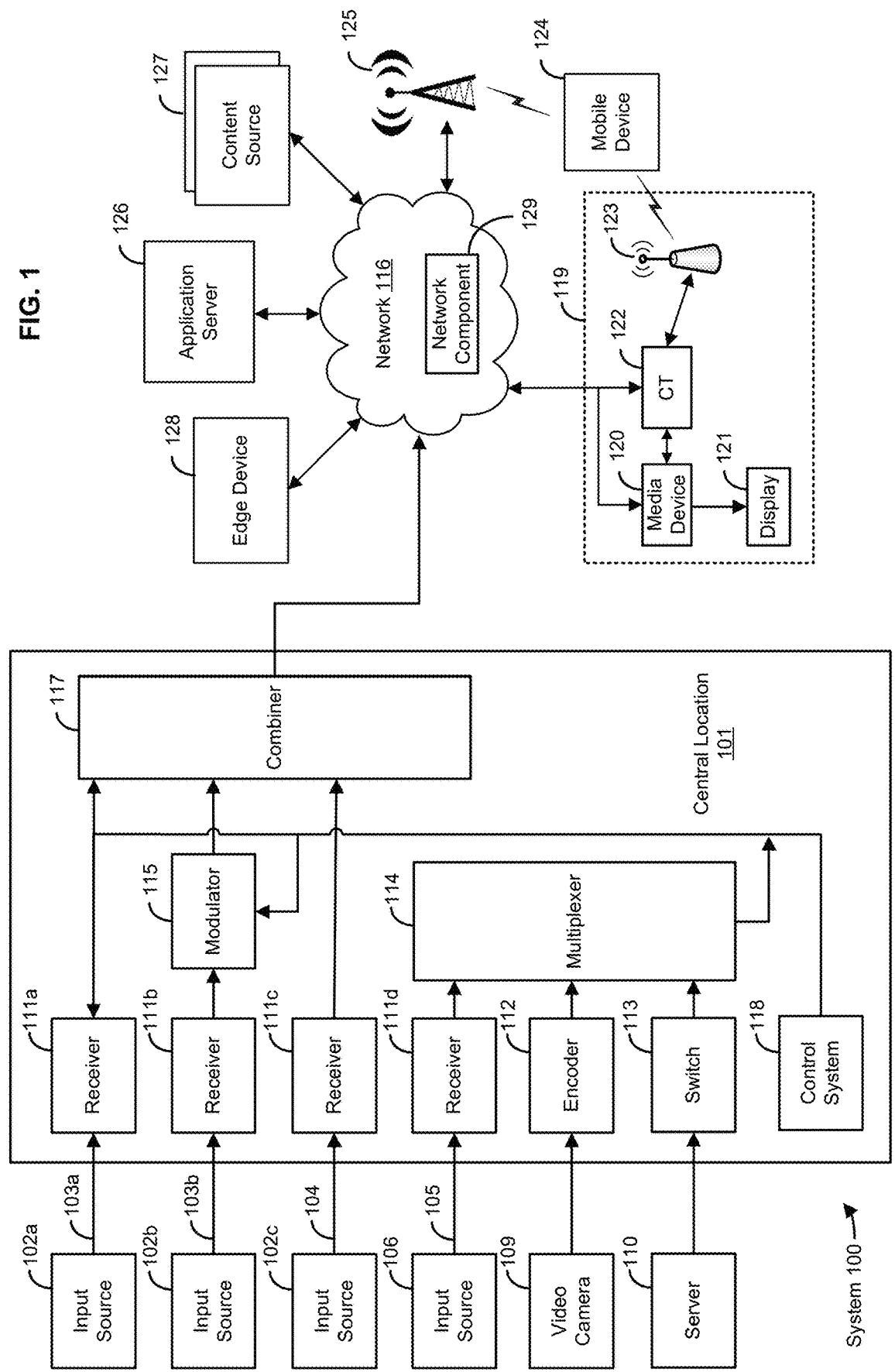
FIG. 1 shows a system for the distribution of content to a user device.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text and/or graphics, which may be but is not limited to electronic representations of videos, movies, or other multimedia, which may be but is not limited to data files adhering to MPEG2, MPEG, MPEG4 UHD, HDR, 4k, Adobe® Flash® Video (.FLV) format or some other video file format whether such format is presently known or developed in the future. The content items described herein may be electronic representations of music, spoken words, or other audio, which may be but is not limited to data files adhering to the MPEG-1 Audio Layer 3 (.MP3) format, Adobe®, CableLabs 1.0,1.1, 3.0, AVC, HEVC, H.264, Nielsen watermarks, V-chip data and Secondary Audio Programs (SAP). Sound Document (.ASND) format or some other format configured to store electronic audio whether such format is presently known or developed in the future. In some cases, content may be data files adhering to the following formats: Portable Document Format (.PDF), Electronic Publication (.EPUB) format created by the International Digital Publishing Forum (IDPF), JPEG (.JPG) format, Portable Network Graphics (.PNG) format, dynamic ad insertion data (.csv), Adobe® Photoshop® (.PSD) format or some other format for electronically storing text, graphics and/or other information whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio.

This detailed description may refer to a given entity performing some action. It should be understood that this language may in some cases mean that a system (e.g., a computer) owned and/or controlled by the given entity is actually performing the action.

Methods and systems are described herein for synchronization of Digital Rights Management (DRM) data (e.g., encryption key data) across multiple computing devices (e.g., multiple content packagers). By synchronizing the DRM data for requested content across multiple devices, the per-key DRM metadata included in the DRM data will not change over time for the multiple computing devices. Accordingly, when content retrieval is changed from a first of the multiple computing devices to a second of the multiple computing devices, the second computing device may already have the DRM data to include with the requested content and limiting the potential for disruption of the requested content at the user device.

The system may include a primary computing device and a secondary computing device. Each of the primary and secondary computing devices may include a packager and a cache or other storage device associated with the packager. The designation of which computing device is primary and which is secondary is arbitrary and may be based on which computing device is currently best suited to provide requested content to a user device (e.g., based on location, network conditions, etc.). The primary computing device and the secondary computing device may be aware of each other and the priority each has to providing the requested content to the user device. The primary computing device may be the initial computing device (e.g., a packager) to provide requested content to a user device. If the primary computing device becomes unable to continue providing the requested content to the user device, a shift may be made to the secondary computing device (e.g., a second packager) to continue providing the requested content to the user device. The cache (e.g., or other storage device associated with the corresponding packager) of each of the primary computing device and the secondary computing device may be configured to communicate directly with one another.

A computing device (e.g., a packager) may receive a request for content from a user device via a network. The request for content may include a content identifier identifying the content and a segment identifier or clock identifying the segment or portion of the content being requested. The computing device (e.g., the packager) may send a request to an encoder requesting the content. The content may be received by the computing device from the encoder. The content may be in an unencrypted format. The computing device may also receive a manifest file associated with the content from the encoder.

The computing device (e.g., the packager) may check or otherwise send a request to a storage device (e.g., a cache) local to or part of the computing device to determine if the computing device has a copy of encryption key data (e.g., an encryption key and/or key metadata) for encrypting the requested content. The computing device may determine or receive a response from the storage device indicating that the encryption key data for the requested content is not available. The computing device may send a request to another computing device (e.g., a second packager or storage device associated with the second packager) requesting a copy of encryption key data (e.g., an encryption key and/or key metadata) for encrypting the requested content.

If the second computing device has a copy of the requested encryption key data, the computing device (e.g., the packager or the cache) may receive the requested encryption key data from the second computing device (e.g., the second packager or second cache or another storage device associated with the second packager). The computing device may store the received copy of the encryption key data in the storage device (e.g., cache). The computing device may encrypt the content based on the received encryption key. The computing device may modify the manifest file received from the encoder to include at least a portion of the encryption key data (e.g., all or a portion of the key metadata). The computing device may send the encrypted content and the modified manifest file to the user device for display of the requested content.

If the second computing device does not have a copy of the requested encryption key data, the second computing device (e.g., the second packager) may send a request for the encryption key data to a keystore (e.g., or other form of storage device wherein encryption keys, encryption tokens, and/or key metadata associated with the requested content may be stored). The second computing device (e.g., the second packager) may receive the requested encryption key data (e.g., an encryption key and/or key metadata) from the keystore and may store the encryption key data in the second storage device (e.g., second cache or another storage device associated with the second packager). The second computing device (e.g., the second packager or second cache) may send the encryption key data to the computing device (e.g., the packager or the cache). The computing device may receive the requested encryption key data and may store it in the cache (e.g., or another storage device associated with the packager). The computing device may encrypt the content based on the received encryption key in the encryption key data. The computing device may modify the manifest file received from the encoder to include at least a portion of the encryption key data (e.g., all or a portion of the key metadata). The computing device may send the content and the modified manifest file to the user device for display of the requested content.

If the second computing device does not have a copy of the requested encryption key data, the second computing device (e.g., the second packager or second cache) may send a response to the computing device (e.g., the packager or the cache) indicated that the second computing device does not have the requested encryption key data. The computing device may receive the response and send a request for the encryption key data to a keystore (e.g., or other form of storage device wherein encryption keys, encryption tokens, and/or key metadata associated with the requested content may be stored). The computing device (e.g., the packager or cache) may receive the requested encryption key data from the keystore and may store the encryption key data in the cache (e.g., or another storage device associated with the packager). The computing device may encrypt the received content from the encoder based on the encryption key received from the keystore. The computing device may modify the manifest file received from the encoder to include at least a portion of the encryption key data (e.g., all or a portion of the key metadata). The computing device may send the content and the modified manifest file to the user device for display of the requested content.

FIG. 1 shows a system 100 for the distribution of content to a user device. Those skilled in the art will appreciate that digital equipment and/or analog equipment may be employed. One skilled in the art will appreciate that provided herein is a functional description and that the respective functions may be performed by software, hardware, or a combination of software and hardware.

The system 100 may have a central location 101 (e.g., a headend), which may receive content from multiple sources. The central location 101 may combine the content from the various sources and may distribute the content to user (e.g., subscriber) locations (e.g., location 119) via a network 116.

The central location 101 may receive content from a variety of sources 102a, 102b, 102c. The content may be sent (e.g., transmitted) from the sources 102a, 102b, 102c to the central location 101 via a variety of transmission paths, such as wireless paths (e.g. satellite paths 103a, 103b) and terrestrial path 104. The central location 101 may also receive content from an input source 106 via a direct line 105 (e.g., one or more communication links and/or one or more communication paths). Other input sources may comprise capture devices, such as a video camera 109, a server 110, and/or the like. The content provided by the content sources may comprise a single content item, a portion of a content item (e.g., content fragment), a content stream, a multiplex that includes several content items, and/or the like.

The central location 101 may comprise one or a plurality of receivers 111a, 111b, 111c, 111d that are associated with one or more corresponding input sources. The central location 101 may comprise one or more encoders 112, switches 113, multiplexers, and/or the like. An encoder 112 may compress, encrypt, transform, and/or otherwise encode content. The encoder 112 may encode content based on one or more compression standards, such as MPEG. The encoder may receive content from the video camera 109 and/or other source and apply one or more encoding algorithms to the received content. A switch 113 may provide access to server 110, which may be a Pay-Per-View server, a data server, an internet router, a network system, a phone system, and the like. Some signals may require additional processing, such as signal multiplexing, prior to being modulated. Such multiplexing may be performed by multiplexer 114.

The central location 101 may comprise one or more modulators 115 for interfacing with the network 116. The one or more modulators 115 may receive content from a receiver 111, encoder 112, multiplexer 114, and/or the like. The one or more modulators 115 may convert the received content into a modulated output signal suitable for transmission over the network 116. The one or more modulators 115 may map portions of the content to data bits expressed as signals (e.g., sinusoidal signals) at corresponding subcarrier frequencies of a data symbol. The output signals from the modulators 115 may be combined, using equipment such as a combiner 117, for input into the network 116.

The network 116 may be a content delivery network, a content access network, and/or the like. The network 116 may be configured to provide content from a variety of sources using a variety of network paths, protocols, devices, and/or the like. The content delivery network and/or content access network may be managed (e.g., deployed, serviced) by a content provider, a service provider, and/or the like.

A control system 118 may permit a system operator to control and monitor the functions and performance of system 100. The control system 118 may interface, monitor, and/or control a variety of functions, including, but not limited to, the channel lineup for a television system, billing for each user, conditional access for content distributed to users, and the like. The control system 118 may provide input to the modulators for setting operating parameters, such as system specific MPEG table packet organization or conditional access information. The control system 118 may be located at central location 101 or at a remote location.

The network 116 may distribute content from the central location 101 to user locations, such as user location 119. The network 116 may be an optical fiber network, a coaxial cable network, a hybrid fiber-coaxial network, a wireless network, a satellite system, a direct broadcast system, or any combination thereof.

A multitude of users may be connected to the network 116. At the user location 119, a media device 120 may demodulate and/or decode, if needed, the signals for display on a display device 121, such as on a television set (TV) or a computer monitor. The media device 120 may be a demodulator, decoder, frequency tuner, and/or the like. The media device 120 may be directly connected to the network (e.g., for communications via in-band and/or out-of-band signals of a content delivery network) and/or connected to the network 116 via a communication terminal 122 (e.g., for communications via a packet switched network). The media device 120 may be a set-top box, a digital streaming device, a gaming device, a media storage device, a digital recording device, a computing device, a mobile computing device (e.g., a laptop, a smartphone, a tablet, etc.), a combination thereof, and/or the like. The media device 120 may implement one or more applications, such as content viewers, social media applications, news applications, gaming applications, content stores, electronic program guides, and/or the like. Those skilled in the art will appreciate that the signal may be demodulated and/or decoded in a variety of equipment, including the communication terminal 122, a computer, a TV, a monitor, or a satellite dish.

The communication terminal 122 may be located at the user location 119. The communication terminal 122 may be configured to communicate with the network 116. The communication terminal 122 may be a modem (e.g., cable modem), a router, a gateway, a switch, a network terminal (e.g., optical network unit), and/or the like. The communication terminal 122 may be configured for communication with the network 116 via a variety of protocols, such as internet protocol, transmission control protocol, file transfer protocol, session initiation protocol, voice over internet protocol, and/or the like. The communication terminal 122, for a cable network, may be configured to provide network access via a variety of communication protocols and standards, such as Data Over Cable Service Interface Specification (DOCSIS).

A first access point 123 (e.g., a wireless access point) may be located at the user location 119. The first access point 123 may be configured to provide one or more wireless networks in at least a portion of the user location 119. The first access point 123 may be configured to provide access to the network 116 to devices configured with a compatible wireless radio, such as a mobile device 124, the media device 120, the display device 121, or other computing devices (e.g., laptops, sensor devices, security devices). The first access point 123 may provide a user managed network (e.g., local area network), a service provider managed network (e.g., public network for users of the service provider), and/or the like. It should be noted that in some configurations, some or all of the first access point 123, the communication terminal 122, the media device 120, and the display device 121 may be implemented as a single device.

The user location 119 is not necessarily fixed. A user may receive content from the network 116 on the mobile device 124. The mobile device 124 may be a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 may communicate with a variety of access points (e.g., at different times and locations or simultaneously if within range of multiple access points). The mobile device 124 may communicate with a second access point 125. The second access point 125 may be a cell tower, a wireless hotspot, another mobile device, and/or other remote access point. The second access point 125 may be within range of the user location 119 or remote from the user location 119. The second access point 125 may be located along a travel route, within a business or residence, or other useful locations (e.g., travel stop, city center, park).

The system 100 may have an application server 126. The application server 126 may provide services related to applications. The application server 126 may have an application store. The application store may be configured to allow users to purchase, download, install, upgrade, and/or otherwise manage applications. The application server 126 may be configured to allow users to download applications to a device, such as the mobile device 124, communications terminal 122, the media device 120, the display device 121, and/or the like. The application server 126 may run one or more application services to provide data, handle requests, and/or otherwise facilitate operation of applications for the user.

The system 100 may have one or more content sources 127. The content source 127 may be configured to provide content (e.g., video, audio, games, applications, data) to the user. The content source 127 may be configured to provide streaming media, such as on-demand content (e.g., video on-demand), content recordings, and/or the like. The content source 127 may be managed by third party content providers, service providers, online content providers, over-the-top content providers, and/or the like. The content may be provided via a subscription, by individual item purchase or rental, and/or the like. The content source 127 may be configured to provide the content via a packet switched network path, such as via an internet protocol (IP) based connection. The content may be accessed by users via applications, such as mobile applications, television applications, set-top box applications, gaming device applications, and/or the like. An application may be a custom application (e.g., by content provider, for a specific device), a general content browser (e.g., web browser), an electronic program guide, and/or the like.

The system 100 may have one or more edge devices 128. Each edge device 128 may be configured to provide content, services, and/or the like to the user location 119. Each edge device 128 may be one of a plurality of edge devices distributed across the network 116. Each edge device 128 may be located in a region proximate to or remote from the user location 119. A request for content from the user may be directed to one of the edge devices 128 (e.g., due to the location of the edge device and/or network conditions). Each edge device 128 may be configured to package content for delivery to the user (e.g., in a specific format requested by a user device), provide the user a manifest file (e.g., or other index file describing portions of the content), provide streaming content (e.g., unicast, multicast), provide a file transfer, and/or the like. For example, the packaging of content by the edge device 128 may include encrypting the content before it is sent to the user location 119. Each edge device 128 may cache or otherwise store content (e.g., frequently requested content) to enable faster delivery of content to users.

One or more of the edge devices 128 (e.g., a first edge device) may be configured to communicate (e.g., directly or indirectly) with one or more others of the edge devices 128 (e.g., a second edge device). Each of the first edge device 128 and the second edge device 128 may be configured to receive content from the encoder 112 at the central location 101 and package and/or encrypt the requested content to be sent for delivery to the user (e.g., at the user location 119. Each of the first edge device 128 and the second edge device 128 may be configured to receive the manifest file (e.g., or other index file describing portions of the content) associated with the requested content from the encoder 112 at the central location 101. Each of the first edge device 128 and the second edge device 128 may be configured to receive encryption key data (e.g., an encryption key, encryption key metadata, etc.) associated with the requested content from one or more of the central location 101 or the other respective edge device 128 of the first edge device 128 and the second edge device 128, or another edge device 128. Each of the first edge device 128 and the second edge device 128 may cache or otherwise store the encryption key data (e.g., the encryption key, the key metadata, etc.) to enable faster delivery of the encrypted content to the user. Each of the first edge device 128 and the second edge device 128 may be configured to encrypt the requested content based on the received encryption key in the encryption key data and modify the manifest file (e.g., or other index file describing portions of the content) to include at least a portion of the encryption key data (e.g., the encryption key and/or the key manifest).

The network 116 may have a network component 129. The network component 129 may be any device, module, and/or the like communicatively coupled to the network 116. The network component 129 may be a router, a switch, a splitter, a packager, a gateway, an encoder, a storage device, a multiplexer, a network access location (e.g., tap), physical link, and/or the like.

Figure 2:
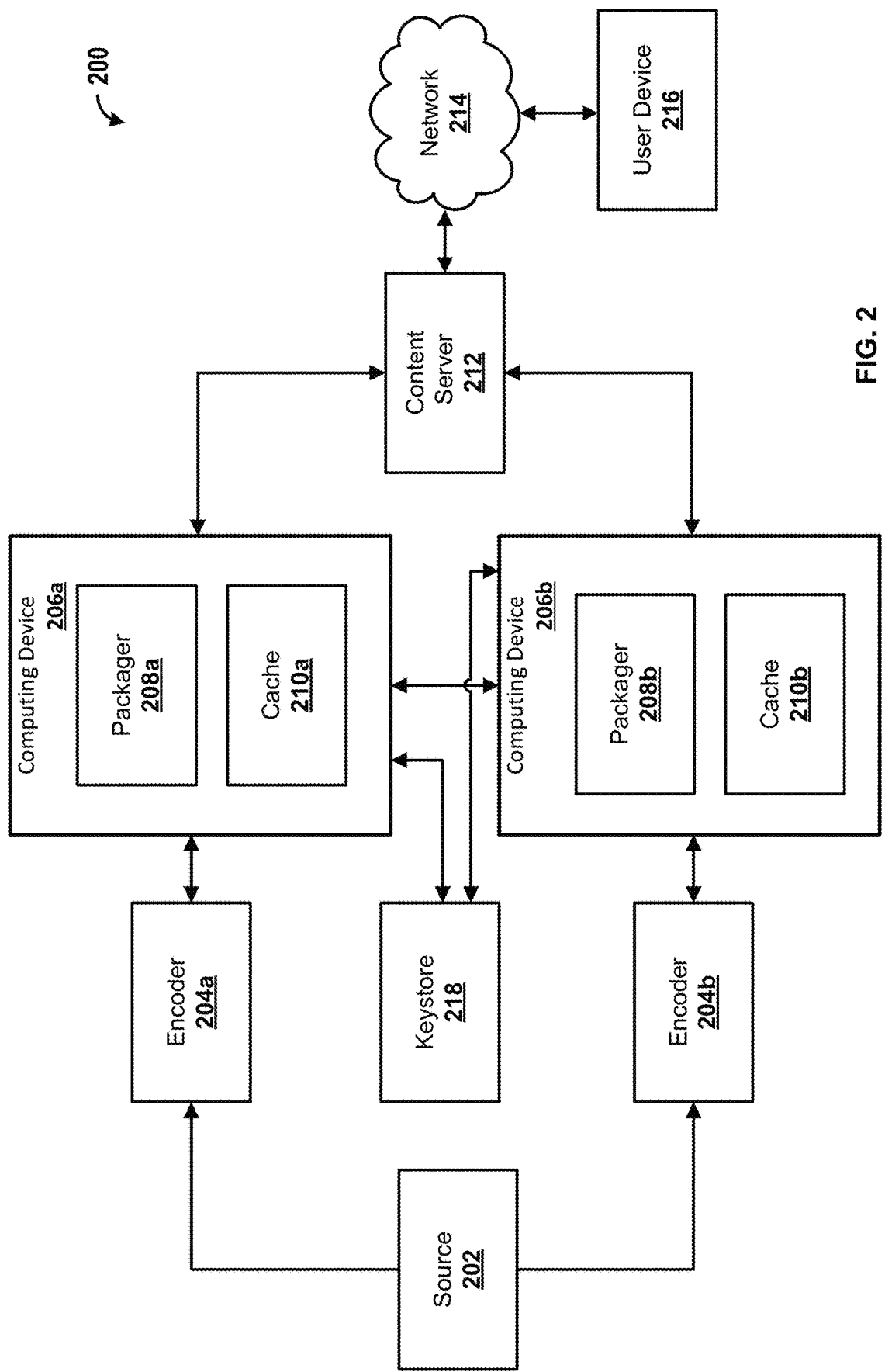
FIG. 2 shows a system for synchronizing digital rights management data.

FIG. 2 shows an example system 200 for synchronizing digital rights management data between multiple packagers. The system 200 may include a multiple computing devices/ entities in communication via a network 214. The network 214 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 214 via a variety of transmission paths, including wireless paths (e.g., satellite paths, Wi-Fi paths, cellular paths, etc.) and terrestrial paths (e.g., wired paths, a direct feed source via a direct line, etc.). The network 214 may include public networks, private networks, wide area networks (e.g., Internet), local area networks, and/or the like. The network 214 may include a content access network, content distribution network, and/or the like. The network 214 may be configured to provide content from a variety of sources using a variety of network paths, protocols, devices, and/or the like. The content delivery network and/or content access network may be managed (e.g., deployed, serviced) by a content provider, a service provider, and/or the like. The network 214 may deliver content items from a source(s) to a user device(s).

The system 200 may include a source 202, such as a server or other computing device. The source 202 may receive source streams for multiple content items. The source streams may be live streams (e.g., a linear content stream) and/or video-on-demand (VOD) streams. The source 202 may receive the source streams from an external server or device (e.g., a stream capture source, a data storage device, a media server, etc.). The source 202 may receive the source streams via a wired or wireless network connection, such as the network 214 or another network (not shown).

The source 202 may include a headend, a video-on-demand server, a cable modem termination system, and/or the like. The source 202 may provide content (e.g., video, audio, games, applications, data) and/or content items (e.g., video, streaming content, movies, shows/programs, etc.) to user devices 216. The source 202 may provide streaming media, such as live content, on-demand content (e.g., video-on-demand), content recordings, and/or the like. The source 202 may be managed by third-party content providers, service providers, online content providers, over-the-top content providers, and/or the like. A content item may be provided via a subscription, by individual item purchase or rental, and/or the like. The source 202 may be configured to provide content via the network 214. Content may be accessed by user devices via applications, such as mobile applications, television applications, set-top box applications, gaming device applications, and/or the like. An application may be a custom application (e.g., by a content provider, for a specific device), a general content browser (e.g., a web browser), an electronic program guide, and/or the like.

The source 202 may provide uncompressed content items, such as raw video data, comprising one or more portions (e.g., frames/slices, groups of pictures (GOP), coding units (CU), coding tree units (CTU), etc.). It should be noted that although a single source 202 is shown in FIG. 2, this is not to be considered limiting. In accordance with the described techniques, the system 200 may comprise multiple sources 202, each of which may receive any number of source streams.

The system 200 may include one or more encoders 104, such as a video encoder, a content encoder, etc. For example, the system 200 may include a first encoder 204a and a second encoder 204b. The first encoder 204a may be a primary encoder for the system 200 and the second encoder 204b may be a secondary encoder that provides content to a user device 216 when the first encoder 204a is unable to provide content. In another example, the second encoder 204b is the primary encoder for the system 200 and the first encoder 204a is the secondary encoder. It should be noted that although two encoders 204a, 204b are shown in FIG. 2, this is not to be considered limiting. In accordance with the described techniques, the system 200 may include a single encoder 204 or multiple additional encoders 204 that may be secondary to a primary encoder (e.g., the first encoder 204a or the second encoder 204b).

Each of the encoders 204a, 204b may be configured to encode one or more source streams (e.g., received via the source 202) into multiple content items/streams at various bit rates (e.g., various representations). Each of the encoders 204a, 204b may be configured to determine one or more encoding parameters. The encoding parameters may be based on one or more content streams encoded by the encoder 204a, 204b. For example, an encoding parameter may include at least one of an encoding quantization level (e.g., a size of coefficient range for grouping coefficients), a predictive frame error, a relative size of an inter-coded frame with respect to an intra-coded frame, a number of motion vectors to encode in a frame, a quantizing step size (e.g., a bit precision), a combination thereof, and/or the like. As another example, an encoding parameter may include a value indicating at least one of a low complexity to encode, a medium complexity to encode, or a high complexity to encode. As a further example, an encoding parameter may include a transform coefficient(s), a quantization parameter value(s), a motion vector(s), an inter-prediction parameter value(s), an intra-prediction parameter value(s), a motion estimation parameter value(s), a partitioning parameter value(s), a combination thereof, and/or the like. The encoder 204 may be configured to insert encoding parameters into the content streams and/or provide encoding parameters to other devices within the system 200.

Encoding a content stream/item may include the encoder 204a, 204b partitioning a portion and/or frame of the content stream/item into multiple coding tree units (CTUs). Each of the CTUs may include multiple pixels. The CTUs may be partitioned into coding units (CUs) (e.g., coding blocks). For example, a content item may include multiple frames (e.g., a series of frames/pictures/portions, etc.). The frames may include I-frames, P-frames, and/or B-frames. An I-frame (e.g., an Intra-coded picture) may include and/or represent a complete image/picture. A P-frame (e.g., a Predicted picture/delta frame) may include only the changes in an image from a previous frame. For example, in a scene where a person moves across a stationary background, only the person's movements need to be encoded in a corresponding P-frame in order to indicate the change in the person's position with respect to the stationary background. To save space and computational resources, the encoder 204a, 204b may not store information/data indicating any unchanged background pixels in the P-frame. A B-frame (e.g., a Bidirectional predicted picture) may enable the encoder 204a, 204b to save more space and computational resources by storing differences between a current frame and both a preceding and a following frame. Each frame of a content item may be divided into a quantity of partitions. Each partition may include multiple pixels. Depending on a coding format (e.g., a CODEC), the partition may be a block, a macroblock, a CTU, etc. The order in which I-frames, P-frames, and B-frames are arranged is referred to herein as a Group of Pictures (GOP) structure—or simply a GOP. The encoder 204a, 204b may encode frames as open GOPs or as closed GOPs.

The system 200 may include one or more computing devices 206. For example, the system 200 may include a first computing device 206a and a second computing device 206b. The first computing device 206a may be a primary computing device for packaging content from the first encoder 204a of the system 200 and the second computing device 206b may be a secondary computing device for packaging content from the second encoder 204b when the first encoder 204a and/or the first computing device 206a are unable to provide the requested content to a user device 216. In another example, the second computing device 206b may be the primary computing device for the system 200 and the first computing device 206a may be the secondary or back-up computing device. It should be noted that although two computing devices 206a, 206b are shown in FIG. 2, this is not to be considered limiting. In accordance with the described techniques, the system 200 may include a more than two computing devices for packaging content for delivery to the user (e.g., at the user device 216).

The first computing device 206a may include a first packager 208a. The first packager 208a may be configured to receive content (e.g., one or more content items/streams) from the first encoder 204a. The first packager 208a may be configured to prepare content (e.g., content items/streams) for distribution. For example, the first packager 208a may be configured to convert encoded content (e.g., encoded content items/streams) into multiple content fragments. The first packager 208a may be configured to encrypt the multiple content fragments based on an encryption key/token. The first packager 208a may be configured to receive a manifest file (e.g., or other index file describing portions of the content) from the first encoder 204a. The manifest file may provide information associated with the content received from the first encoder 204a.

The first packager 208a may be configured to request encryption key data from and receive encryption key data from a keystore 218 the cache 210a of the second computing device 206a (e.g., the second packager 208b and/or the second cache 210b). The encryption key data may include encryption keys, encryption tokens and key metadata associated with the requested content. The keystore 218 may be a repository or other form of storage device wherein encryption keys, encryption tokens, and/or key metadata associated with the requested content may be stored. For example, the keystore 218 may be located remotely from the first computing device 206a (e.g., at the central location 101 of FIG. 1). The first computing device 206a (e.g., the first packager 208a) may be configured to encrypt the requested content based on the encryption key and/or tokens. The encryption keys and/or tokens may also be used to facilitating the decryption of the encrypted content at, for example, the user device 216. The key metadata may include data indicating what type of encryption key it is, what type of encryption was completed on the content, a timestamp identifying when the encryption key was created, when the encryption key expires, a unique identifier for the encryption key, the content associated with the encryption key, who owns the encryption key and/or what the encryption key is used for.

The first packager 208a may be configured to determine if encryption key data associated with the requested content is stored or otherwise located in a first cache 210a or other storage medium associated with the first packager 208a. For example, the first packager 208a may send a request to the first cache 210a (e.g., or other storage medium local to the first packager 208a) for the encryption key data associated with the requested content. For example, if the encryption key data for the requested content is included/stored in the first cache 210a, the encryption key data (e.g., encryption key and/or key metadata) may be sent/read from the first cache 210a to the first packager 208a. The first packager 208a may encrypt the requested content based on the encryption key and may modify the manifest file to include all or a portion of the key metadata.

If the encryption key data for the requested content is not included/stored in the first cache 210a (e.g., or another storage medium local to the first packager 208a), for example, the first packager 208a may be configured to request encryption key data from and receive encryption key data from a second computing device 206b. For example, the first packager 208a (e.g., or first cache 210a) may be configured to send a request to the second cache 210b (e.g., or other storage medium local to the second packager 208b) for the encryption key data associated with the requested content. For example, if the encryption key data for the requested content is included/stored in the second cache 210b, the encryption key data may be sent from the second cache 210b to the first packager 208a. The first packager 208a may store the received encryption key data in the first cache 210a (e.g., or another storage medium local to the first packager 208a).

The first computing device 206a (e.g., the first packager 208a) may be configured to encrypt the requested content based on the encryption key received from the second cache 210b. The first computing device 206a may be configured to modify the manifest file (e.g., or other index file describing portions of the content). For example, the first packager 208a may be configured to retrieve a portion of the encryption key data and place the portion of the encryption key data into the manifest file. For example, the encryption key data may include an encryption key and key metadata, and the first packager 208a may insert all or a portion of the key metadata into the manifest file for the requested content. The first computing device 206a may be configured to send one or more of the content and the content metadata (e.g., the modified content metadata including a portion of the encryption key data). For example, the first computing device 206a may send the encrypted requested content and the modified content metadata (e.g., including at least a portion of the encryption key data) directly or indirectly to the user device 216.

The second computing device 206b may include a second packager 208b. The second packager 208b may be configured to receive content (e.g., one or more content items/streams) from the second encoder 204b. The second packager 208b may be configured to prepare content (e.g., content items/streams) for distribution. For example, the second packager 208b may be configured to convert encoded content (e.g., encoded content items/streams) into multiple content fragments. The second packager 208b may be configured to encrypt the multiple content fragments based on an encryption key/token. The second packager 208b may be configured to receive a manifest file (e.g., or other index file describing portions of the content) from the second encoder 204b. The manifest file may provide information associated with the content received from the second encoder 204b.

The second packager 208b may be configured to request encryption key data from and receive encryption key data from the keystore 218. The encryption key data may include encryption keys, encryption tokens and key metadata associated with the requested content. The keystore 218 may be located remotely from the second computing device 208a (e.g., at the central location 101 of FIG. 1). The second computing device 206b (e.g., the second packager 208b) may be configured to encrypt the requested content based on the encryption key and/or tokens. The encryption keys and/or tokens may also be used to facilitating the decryption of the encrypted content at, for example, the user device 216.

The second packager 208b may be configured to determine if encryption key data associated with the requested content is stored or otherwise located in a second cache 210b or other storage medium associated with the second packager 208b. For example, the second packager 208b may send a request to the second cache 210b (e.g., or other storage medium local to the second packager 208b) for the encryption key data associated with the requested content. For example, if the encryption key data for the requested content is included/stored in the second cache 210b, the encryption key data may be sent/read from the second cache 210*b* to the second packager 208*b*. The second packager 208*b* may encrypt the requested content based on the encryption key and may modify the manifest file to include all or a portion of the key metadata.

If the encryption key data for the requested content is not included/stored in the second cache 210*b* (e.g., or another storage medium local to the second packager 208*b*), for example, the second packager 208*b* may be configured to request encryption key data from and receive encryption key data from the first computing device 206*a*. For example, the second packager 208*b* (e.g., or second cache 210*b*) may be configured to send a request to the first cache 210*a* (e.g., or other storage medium local to the first packager 208*a*) for the encryption key data associated with the requested content. For example, if the encryption key data for the requested content is included/stored in the first cache 210*a*, the encryption key data may be sent from the first cache 210*a* to the second packager 208*b* (e.g., or the second cache 210*b*). The second packager 208*b* may store the received encryption key data in the second cache 210*b* (e.g., or another storage medium local to the second packager 208*a*) for subsequent use. The second packager 208*b* may be configured to encrypt the requested content based on the received encryption key in the encryption key data.

The second computing device 206*b* may be configured to modify the manifest file (e.g., or other index file describing portions of the content). For example, the second packager 208*b* may be configured to retrieve a portion of the encryption key data and place the portion of the encryption key data into the manifest file. For example, the encryption key data may include an encryption key and key metadata, and the second packager 208*b* may insert the key metadata into the manifest file for the requested content. The second computing device 206*b* may be configured to send one or more of the content (e.g., encrypted content) and the content metadata (e.g., the modified content metadata including a portion of the encryption key data). For example, the second computing device 206*b* may send the requested content (e.g., encrypted content) and the modified content metadata (e.g., including at least a portion of the encryption key data) directly or indirectly to the user device 216.

The system 200 may include a content server 212. For example, the content server 212 may be configured to receive requests for content, such as content items/streams. The content server 212 may identify a location of a requested content item and provide the content item—or a portion thereof—to a device requesting the content, such as the user device 216. The content server 212 may include a Hypertext Transfer Protocol (HTTP) Origin server. The content server 212 may be configured to provide a communication session with a requesting device, such as the user device 216, based on HTTP, FTP, or other protocols. The content server 212 may be one of multiple content servers distributed across the system 200. The content server 212 may be located in a region proximate to the user device 216. A request for a content stream/item from the user device 216 may be directed to the content server 212 (e.g., due to the location and/or network conditions). The content server 212 may be configured to deliver content streams/items to the user device 216 in a specific format requested by the user device 216. The content server 212 may be configured to provide the user device 216 with a manifest file (e.g., or other index file describing portions of the content) received from one of the first computing device 206*a* and/or the second computing device 206*b* and corresponding to a content stream/item. The content server 212 may be configured to provide streaming content (e.g., unicast, multicast) to the user device 216. The content server 212 may be configured to provide a file transfer and/or the like to the user device 216. The content server 212 may cache or otherwise store content (e.g., frequently requested content) to enable faster delivery of content items to users.

Figure 3:
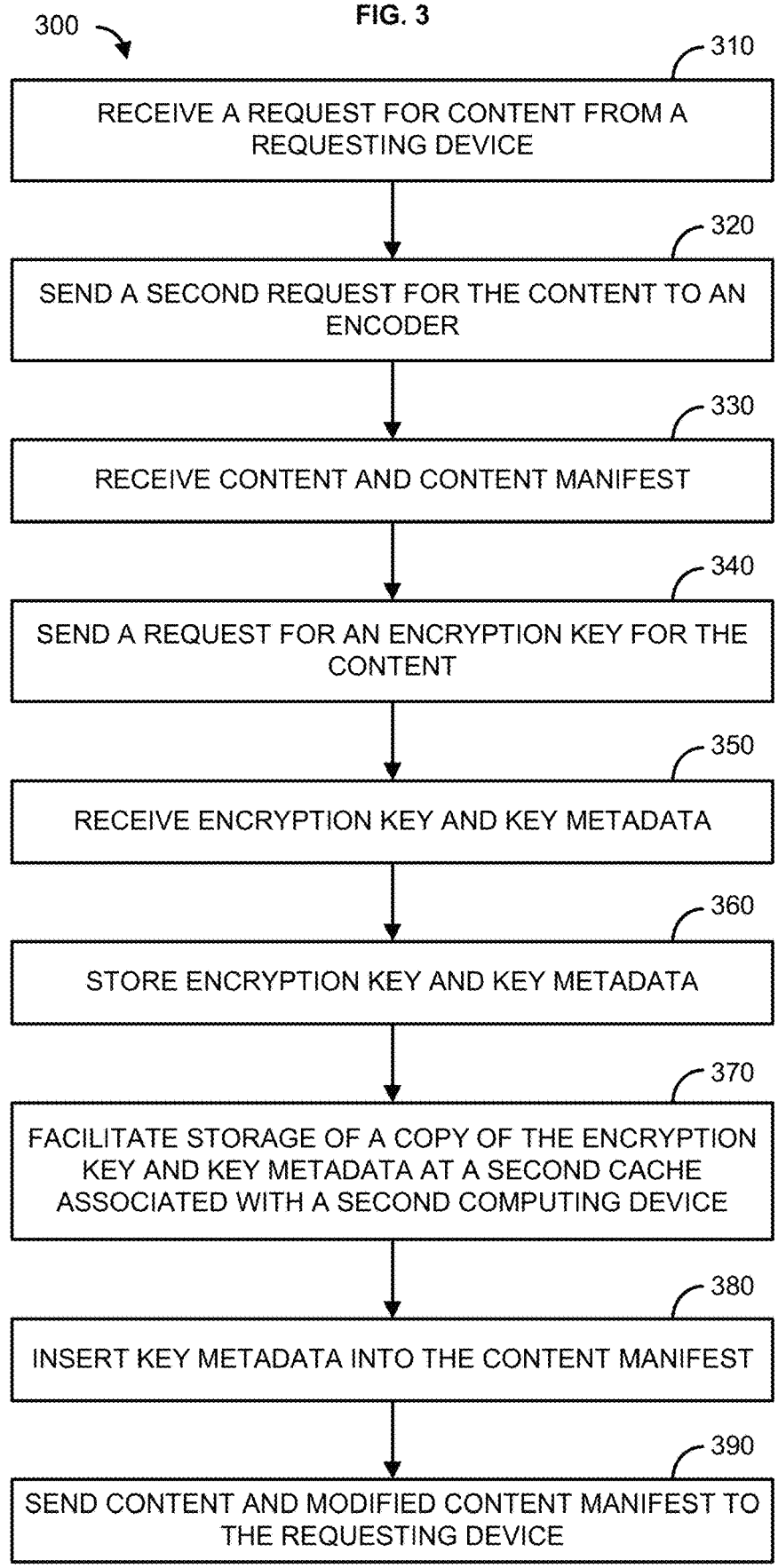
FIG. 3 shows a flowchart of a method for synchronizing digital rights management data for requested content in multiple computing devices.

FIG. 3 is a flowchart of an example method 300 for synchronizing digital rights management data for requested content in multiple computing devices (e.g., a first computing device 206*a* and a second computing device 206*b*). For example, each of the computing devices 206*a*, 206*b*, may include or be communicably coupled to a corresponding packager (e.g., a first packager 208*a* and a second packager 208*b*). For example, one of the packagers 208*a*, 208*b* may be designated as a primary packager (e.g., the first packager 208*a*) and another packager may be designated as a secondary packager (e.g., the second packager 208*b*). Determining which packager (e.g., packager 208*a*, 208*b*) is the primary packager and which is the secondary packager may be based on a number of factors including, but not limited to, the location of the computing device (e.g., the first computing device 206*a* and the second computing device 206*b*) in relation to the user device 216 and/or the content server 212 and/or network conditions (e.g., latency). For example, the primary packager (e.g., the first packager 208*a*) may be the default packager for a particular request for content made by a user device 216. If the first computing device 206*a* (e.g., the first packager 208*a* and/or first cache 210*a*) are experiencing technical issues, stop functioning, or become unavailable due to network conditions, the content server 212 may switch to the secondary packager (e.g., the second packager 208*b*) to continue receiving the requested content for packaging and sending to the user device 216. Those skilled in the art will appreciate that while the example system of FIG. 2 will be described with the first packager 208*a* of the first computing device 206*a* as being a primary packager for a requested content and the second packager 208*b* of the second computing device 206*b* being described as a secondary packager for the requested content, this is for example purposes only. In other examples, the second packager 208*b* could be the primary packager and the first packager 208*a* could be the secondary packager.

At 310, a computing device (e.g., the first computing device 206*a*) may receive a request for content from a requesting device (e.g., the user device 216). For example, the request for content may include a content identifier identifying the content. The requested content may be any one or more of video, audio, games, applications, data, streaming content, movies, shows/programs, etc. The request for content may be received by the first packager 208*a* of the first computing device 206*a* from the user device 216 via the network 214 and the content server 212.

At 320, a second request for content may be sent to an encoder (e.g., the first encoder 204*a*) associated with the computing device (e.g., the first computing device 206*a*). The second request for content may include the content identifier identifying the requested content. The second request for content may be sent in response to receiving the request for content at the first computing device 206*a*. For example, the first packager 208*a* may generate and send the second request for content to the first encoder 204*a* in response to receiving the request for content from the user device 216.

At 330, the computing device (e.g., the first computing device 206*a*) may receive the requested content and a content manifest file (e.g., or other index file describing portions of the content) from an encoder (e.g., the first encoder 204a). For example, the first packager 208a of the first computing device 206a may receive the content and content manifest file from the first encoder 204a in response to first encoder 204a receiving the second request for the content. The received content may be compressed based on one or more compression standards, such as MPEG.

At 340, the first computing device 206a may send a request for an encryption key for the received content. For example the first packager 208a may generate the request for the encryption key. The request may be generated in response to receiving the content and/or receiving the request for content from the user device 216. The request for the encryption key may include a content identifier identifying the content. The request for the encryption key may be sent to the keystore 218 or another repository or other form of storage device where encryption keys, encryption tokens, and/or key metadata associated with the requested content may be stored. For example, the keystore 218 may be located remotely from the first computing device 206a. For example, the keystore 218 may be located at the central location 101. The keystore 218 may include multiple encryption keys and a multitude of key metadata for a variety of content. The encryption key may be a random string of bits or alphanumeric symbols created explicitly for scrambling and unscrambling the requested content.

At 350, the encryption key and key metadata may be received by the computing device (e.g., the first computing device 206a). For example, the encryption key and the key metadata may be received by the first packager 208a from the keystore 218. The key metadata may include information relating to an encryption key. For example, the key metadata may include data indicating what type of encryption key it is, what type of encryption is being completed on the content, a timestamp identifying when the encryption key was created, when the encryption key expires, a unique identifier for the encryption key, the content associated with the encryption key, who owns the encryption key and/or what the encryption key is used for.

The first computing device 306a (e.g., the first packager 308a) may encrypt the received content based on the received encryption key in the encryption key data. The content may be encrypted based on one or more encryption standards. The encrypted content may require the encryption key or all or a portion of the encryption key metadata to be decrypted for display on a user device 216.

At 360, the received encryption key and key metadata may be stored for subsequent use. For example, the first packager 208a may store the encryption key and/or key metadata in a first cache 210a associated with the first packager 208a. For example, the first packager 208a may store the encryption key and/or key metadata in another repository or other form of storage device local to the first packager 208a. Encrypted content may require per-key DRM metadata that doesn't change over time. Thus, storage of the encryption key and key metadata local to the first computing device 206a may enable faster delivery of requested content to users.

At 370, the computing device (e.g., the first computing device 206a) may facilitate storage of a copy of the received encryption key and key metadata at another computing device (e.g., the second computing device 206b). For example, the first packager 208a and/or the first cache 210a may generate and send a message that includes the encryption key and the key metadata to the second packager 208b and/or second cache 210b of the second computing device 206b. The encryption key and key metadata may then be stored in the second cache 210b associated with the second packager 208b or another repository or other form of storage device local to the second packager 208b.

At 380, at least a portion of the key metadata may be inserted into the manifest file (e.g., or other index file describing portions of the requested content). For example, the first packager 208a or another portion of the first computing device 206a may insert all or a portion of the key metadata into the manifest file. For example, the first packager 208a may modify the manifest file by adding one or more of the data indicating what type of encryption key it is, what type of encryption was completed on the content, a timestamp identifying when the encryption key was created, when the encryption key expires, a unique identifier for the encryption key, the content associated with the encryption key, who owns the encryption key and/or what the encryption key is used for from the key metadata.

Figure 4:
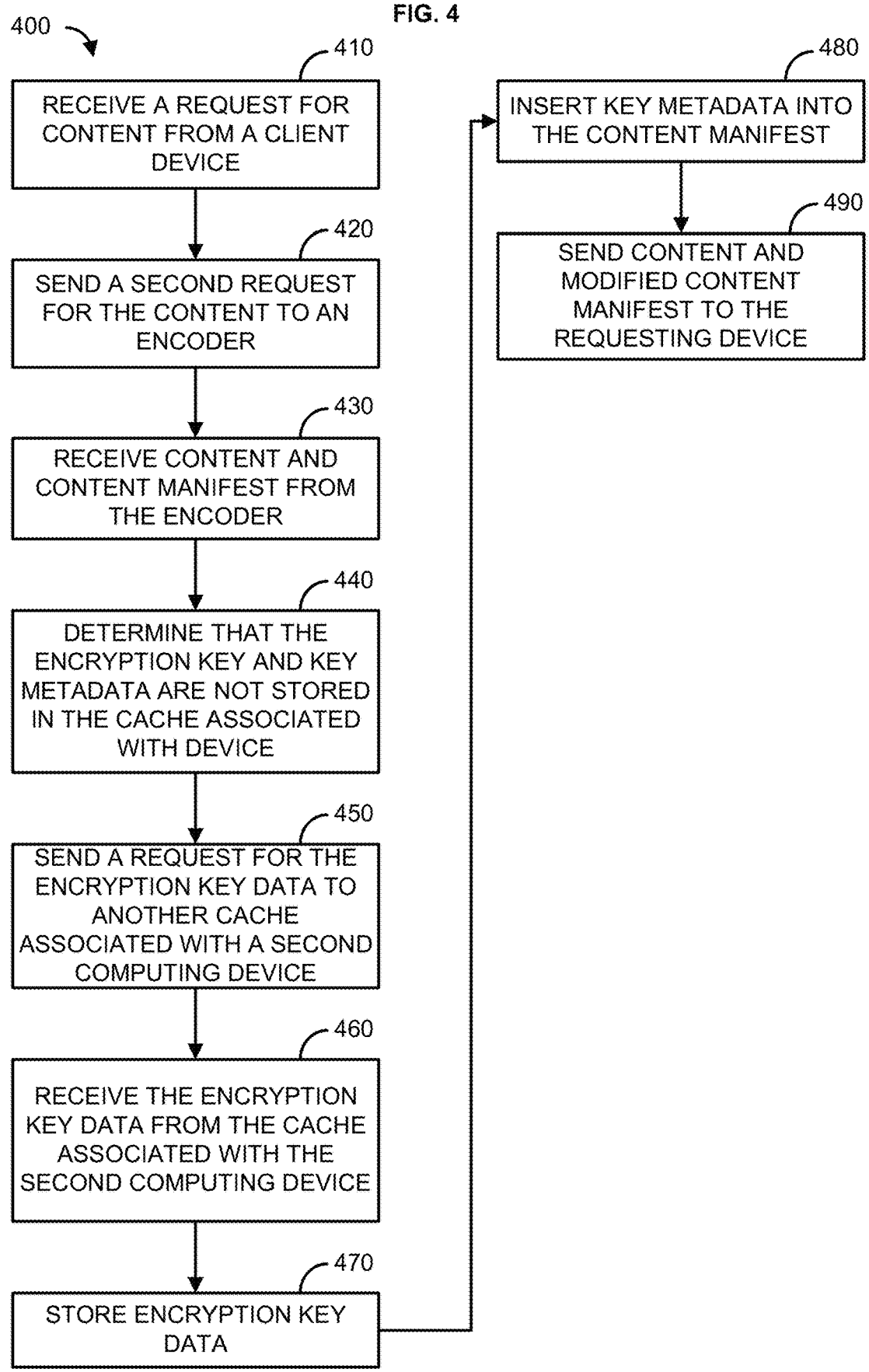
FIG. 4 shows a flowchart of a method for restoring digital rights management data at a computing device.

At 390, the computing device (e.g., the first computing device 206a) may send one or more of the content (e.g., the encrypted content) and the modified manifest file (e.g., or other modified index file describing portions of the content and including at least a portion of the key metadata), to the user device 216. For example, each of the encrypted content and the modified manifest file (e.g., or other modified index file describing portions of the content and including at least a portion of the key metadata), may be sent by the first packager 208a (or another portion of the first computing device 206a) to the user device 216 via the content server 212 and the network 214. For example, the modified manifest file (e.g., or other modified index file describing portions of the content and including at least a portion of the key metadata), may be sent by the first packager 208a (or another portion of the first computing device 206a) to the user device 216 via the content server 212 and the network 214. The content being sent may not be the entire content, and instead, may only be a segment of the content. For example, the segment of the content may be a predetermined length of the content (e.g., two seconds) or a predetermined data amount of the content. When the user device 216 needs the next segment of the requested content, a subsequent request for content may be sent by the user device 216 and received by the first computing device 206a (e.g., the first packager 208a). Because the encryption key data was previously stored in the first cache 210a, the first packager 206a may be able to retrieve the encryption key and key metadata associated with the requested content from the first cache 210a rather than having to request the encryption key data from the keystore 218, to enable faster delivery of the next requested content to users FIG. 4 is a flowchart of an example method 400 for restoring the synchronization of digital rights management data for requested content in multiple computing devices (e.g., a first computing device 206a and a second computing device 206b).

At 410, a computing device may receive a request for content from a requesting device (e.g., the user device 216). For example, the computing device receiving the request may be the first computing device 206a or the second computing device 206b. For example, the request for content may include a content identifier identifying the requested content. The requested content may be any one or more of video, audio, games, applications, data, streaming content, movies, shows/programs, etc. For example, the request for content may be a request for a segment of the content. The segment of the content may be a segment other than the first segment of the content. For example, the request for content may be received by the first packager 208a of the first computing device 206a from the user device 216 via the network 214 and the content server 212. In another example, the request for content may be received by the second packager 208b of the second computing device 206b from the user device 216 via the network and the content server 212.

At 420, a second request for content may be sent to an encoder associated with the computing device. For example, if the first request for the content is received by the first computing device 206a, then the second request for the content may be generated and sent by the first computing device 206a (e.g., the first packager 208a) to the first encoder 204a. If the request for content is received by the second computing device 206b, then the second request for the content may be generated and sent by the second computing device 206b (e.g., the second packager 208b) to the second encoder 204b. The second request for content may include the content identifier identifying the requested content. The second request for content may be sent in response to receiving the request for content at the first computing device 206a or the second computing device 206b.

At 430, the computing device (e.g., the first computing device 206a or the second computing device 206b) may receive the requested content and a content manifest file (e.g., or other index file describing portions of the content) from an encoder (e.g., the corresponding first encoder 204a or second encoder 204b). For example, the first packager 208a of the first computing device 206a may receive the content and content manifest file from the first encoder 204a in response to first encoder 204a receiving the second request for the content from the first computing device 206a. For example, the second packager 208b of the second computing device 206b may receive the content and content manifest file from the second encoder 204b in response to second encoder 204b receiving the second request for the content from the second computing device 206b. The received content may be compressed based on one or more compression standards, such as MPEG.

At 440, the computing device (e.g., the first computing device 206a or the second computing device 206b) may determine that encryption key data (e.g., one or more of the encryption key and key metadata) associated with the requested content is not stored in the cache (e.g., or another repository or other form of storage device). For example, for requests for content received at the first computing device 206a, the first packager 208a may send a request to the first cache 210a (e.g., or another repository or other form of storage device) for the encryption key data. The first cache 210a (or the first packager 208a) may evaluate the contents of the first cache 210a and determine that the encryption key data is not stored in the first cache 210a. The first cache 210a may reply with a miss or other response to the first packager 208a indicating that the first cache does not include the encryption key data associated with the requested content.

For requests for content received at the second computing device 206b, the second packager 208b may send a request to the second cache 210b (e.g., or another repository or other form of storage device) for the encryption key data. The second cache 210b (or the second packager 208b) may evaluate the contents of the second cache 210b and determine that the encryption key data is not stored in the second cache 210b. The second cache 210b may reply with a miss or other response to the second packager 208b indicating that the second cache 210b does not include the encryption key data associated with the requested content.

At 450 the computing device receiving the request for content may send a request for the encryption key data to another computing device (e.g., the first computing device 206a or the second computing device 206b) for the received content. For requests for content received at the first computing device 206a, for example, the first computing device 206a (e.g., the first packager 208a or the first cache 210a) may generate the request for the encryption key data. The request for the encryption key data may include a content identifier identifying the content. The request for the encryption key data may be sent to the second computing device 206b (e.g., the second packager 208b or the second cache 210b (or another repository or other form of storage device associated with the second packager 208b)).

For requests for content received at the second computing device 206b, for example, the second computing device 206b (e.g., the second packager 208b or the second cache 210b) may generate the request for the encryption key data. The request for the encryption key data may include a content identifier identifying the content. The request for the encryption key data may be sent to the first computing device 206a (e.g., the first packager 208a or the first cache 210a (or another repository or other form of storage device associated with the second packager 208b)).

At 460, the encryption key and key metadata may be received by the computing device (e.g., the first computing device 206a or the second computing device 206b) from the corresponding computing device (e.g., the second computing device 206b or the first computing device 206a respectively). For requests for content received at the first computing device 206a, for example, the encryption key data (e.g., one or more of the encryption key and key metadata) may be received by the first computing device 206a (e.g., the first packager 208a or the first cache 210a) from the second computing device 206b (e.g., the second packager 208b or the second cache 210b). For requests for content received at the second computing device 206b, for example, the encryption key data (e.g., one or more of the encryption key and key metadata) may be received by the second computing device 206b (e.g., the second packager 208b or the second cache 210b) from the first computing device 206a (e.g., the first packager 208a or the first cache 210a). The computing device (e.g., the first computing device 206a or the second computing device 206b may encrypt the content based on the received encryption key. For requests for content received at the first computing device 206a, for example, the first computing device 206a (e.g., the first packager 208a) may encrypt the requested content based on the received encryption key. For requests for content received at the second computing device 206b, for example, the second computing device 206b (e.g., the second packager 208b) may encrypt the requested content based on the received encryption key. The received content may be encrypted based on one or more encryption standards. The encrypted content may require the encryption key and/or all or a portion of the key metadata to be decrypted for display on a user device 216.

The key metadata may include information relating to an encryption key. For example, the key metadata may include data indicating what type of encryption key it is, what type of encryption was completed on the content, a timestamp identifying when the encryption key was created, when the encryption key expires, a unique identifier for the encryption key, the content associated with the encryption key, who owns the encryption key and/or what the encryption key is used for.

At 470, the received encryption key data (e.g., the encryption key and/or key metadata) may be stored for subsequent use. For example, for requests for content received at the first computing device 206a, the first packager 208a may store the encryption key data in a first cache 210a (e.g., or another repository or other form of storage device local to the first packager 208a) associated with the first packager 208a. For requests for content received at the second computing device 206b, for example, the second packager 208b may store the encryption key data in a second cache 210b (e.g., or another repository or other form of storage device local to the second packager 208b) associated with the second packager 208b. Encrypted content may require per-key DRM metadata that doesn't change over time. Thus, storage of the encryption key and key metadata local to the first computing device 206a or the second computing device 206b may enable faster delivery of requested content to users.

At 480, at least a portion of the key metadata may be inserted into the manifest file (e.g., or other index file describing portions of the requested content). For requests for content received at the first computing device 206a, for example, the first packager 208a or another portion of the first computing device 206a may insert all or a portion of the key metadata into the manifest file associated with the requested content. For example, the first packager 208a may modify the manifest file by adding one or more of the data indicating what type of encryption key it is, what type of encryption was completed on the content, a timestamp identifying when the encryption key was created, when the encryption key expires, a unique identifier for the encryption key, the content associated with the encryption key, who owns the encryption key and/or what the encryption key is used for from the key metadata.

For requests for content received at the second computing device 206b, for example, the second packager 208b or another portion of the second computing device 206b may insert all or a portion of the key metadata into the manifest file associated with the requested content. For example, the second packager 208b may modify the manifest file by adding one or more of the data indicating what type of encryption key it is, what type of encryption was completed on the content, a timestamp identifying when the encryption key was created, when the encryption key expires, a unique identifier for the encryption key, the content associated with the encryption key, who owns the encryption key and/or what the encryption key is used for from the key metadata.

At 490, the computing device (e.g., the first computing device 206a or the second computing device 206b) may send one or more of the encrypted content (e.g., a segment of the encrypted content) or the modified manifest file (e.g., or other modified index file describing portions of the content and including at least a portion of the key metadata), to the user device 216. For example, each of the content (e.g., the encrypted content, a segment of the encrypted content) and the modified manifest file (e.g., or other modified index file describing portions of the content and including at least a portion of the key metadata), may be sent by the first packager 208a (or another portion of the first computing device 206a) or the second packager 208b (or another portion of the second computing device 206b) to the user device 216 via the content server 212 and the network 214. For example, the modified manifest file (e.g., or other modified index file describing portions of the content and including at least a portion of the key metadata), may be sent by the first packager 208a (or another portion of the first computing device 206a) or the second packager 208b (or another portion of the second computing device 206b) to the user device 216 via the content server 212 and the network 214.

Figure 5:
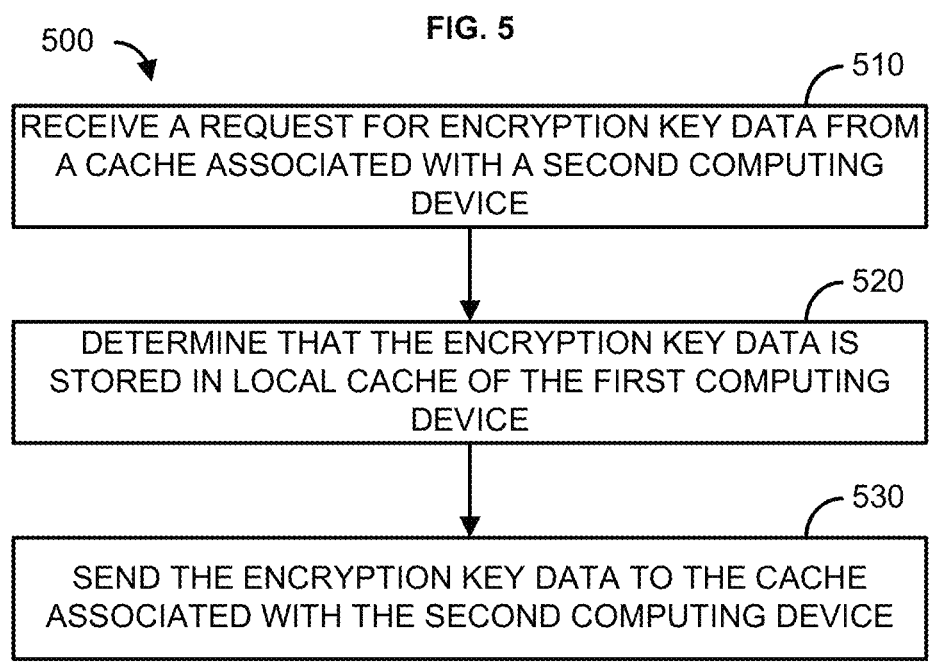
FIG. 5 shows a flowchart of a method for determining that a computing device includes the requested digital rights management data.

FIG. 5 is a flowchart of an example method 500 for determining that a computing device (e.g., a first computing device 206a or a second computing device 206b) includes the requested digital rights management data (e.g., encryption key data). The encryption key data may be one or more of the encryption key and the key metadata.

At 510, a computing device may receive a request for encryption key data from another computing device. For example, the first computing device 206a (e.g., the first packager 208a or first cache 210a) may receive the request for the encryption key data from the second cache 210b (e.g., or second packager 208b) of the second computing device 206b. For example, the second computing device 206B (e.g., the second packager 208b or second cache 210b) may receive the request for the encryption key data from the first cache 210a (e.g., or the first packager 208a) of the first computing device 206a. The request may include a content identifier identifying the content requested by the user device 216. For example, the request may be substantially as described at 450 of FIG. 4.

At 520, the computing device may determine that the encryption key data (e.g., the encryption key and/or key metadata) is stored in the cache (e.g., or another repository or other form of storage device) associated with the computing device. For requests received by the first computing device 206a, for example, the first cache 210a (or the first packager 208a) may evaluate the contents of the first cache 210a and determine that the encryption key data is stored in the first cache 210a. For requests received by the second computing device 206b, for example, the second cache 210b (or the second packager 208b) may evaluate the contents of the second cache 210b and determine that the encryption key data is stored in the second cache 210b.

At 530, the computing device may send the encryption key data (e.g., all or a portion of the encryption key and key metadata) to the other computing device. For requests for the encryption key data received by the first computing device 206a, for example, the first cache 210a (or the first packager 208a) may generate and send a reply message to the second computing device (e.g., the second cache 210b or second packager 208b) that includes the all or at least a portion of the encryption key data. For requests for the encryption key data received by the second computing device 206b, for example, the second cache 210b (or the second packager 208b) may generate and send a reply message to the first computing device 206a (e.g., the first cache 210a or first packager 208a) that includes the all or at least a portion of the encryption key data.

Figure 6:
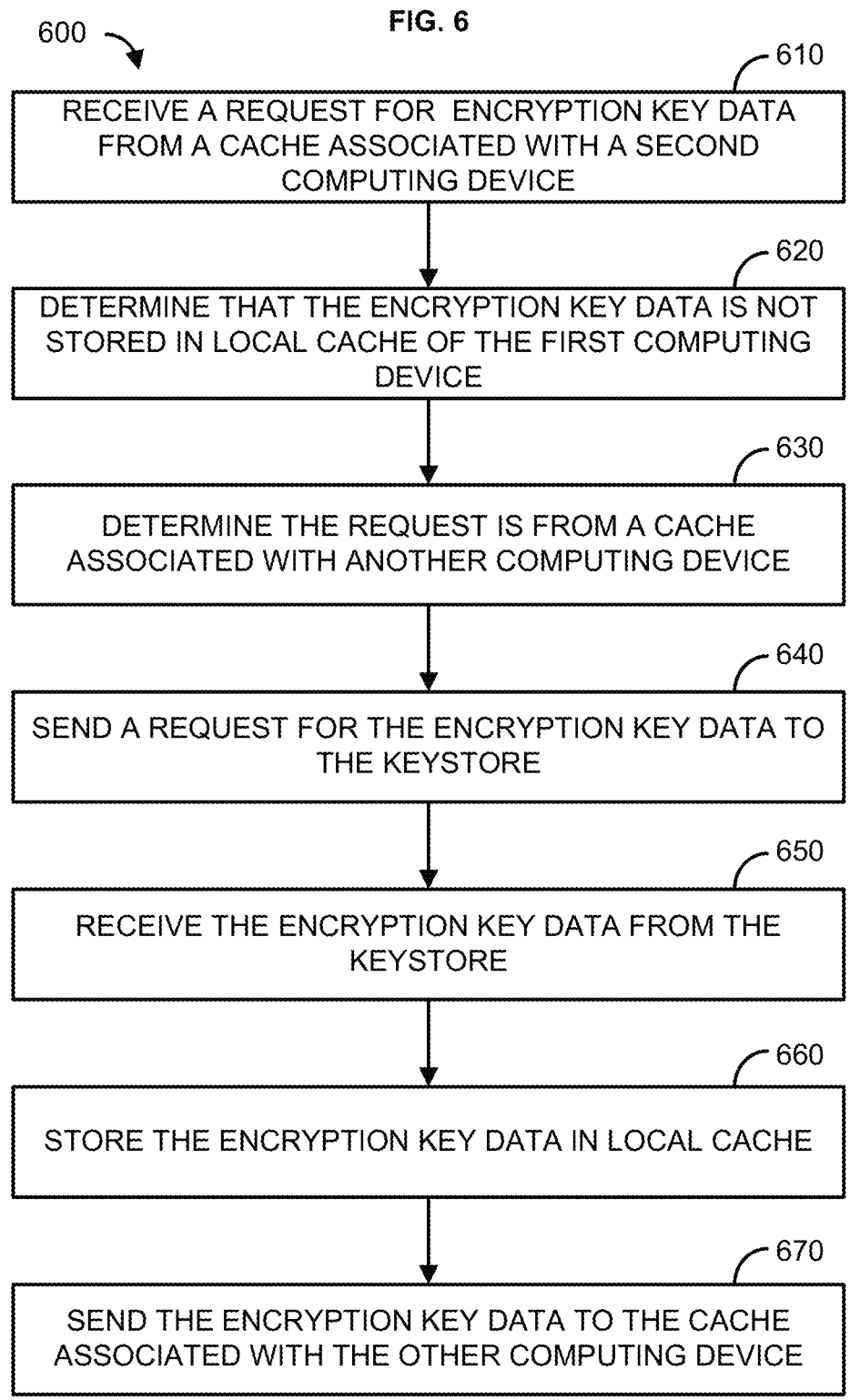
FIG. 6 shows a flowchart of a method for determining that a computing device does not include the requested digital rights management data.

FIG. 6 is a flowchart of an example method 600 for determining that a computing device (e.g., a first computing device 206a or a second computing device 206b) does not include the requested digital rights management data (e.g., encryption key data). The encryption key data may be one or more of the encryption key and the key metadata.

At 610, a computing device may receive a request for encryption key data from another computing device. For example, the first computing device 206a (e.g., the first packager 208a or first cache 210a) may receive the request for the encryption key data from the second cache 210b (e.g., or second packager 208b) of the second computing device 206b. For example, the second computing device 206B (e.g., the second packager 208b or second cache 210b) may receive the request for the encryption key data from the first cache 210a (e.g., or the first packager 208a) of the first computing device 206a. The request may include a content identifier identifying the content requested by the user device 216. For example, the request may be substantially as described at 450 of FIG. 4.

At 620, the computing device may determine that the encryption key data (e.g., the encryption key and/or key metadata) is not stored in the cache (e.g., or another repository or other form of storage device) associated with the computing device. For requests received by the first computing device 206*a*, for example, the first cache 210*a* (or the first packager 208*a*) may evaluate the contents of the first cache 210*a* and determine that the encryption key data is not stored in the first cache 210*a*. For requests received by the second computing device 206*b*, for example, the second cache 210*b* (or the second packager 208*b*) may evaluate the contents of the second cache 210*b* and determine that the encryption key data is not stored in the second cache 210*b*.

At 630, the computing device determines that the request for the encryption key data is from a cache (e.g., or packager or computing device) associated with another device. For example, when requests are sent between the primary computing device (e.g., a first computing device 206*a*) and a secondary computing device (e.g., the second computing device 206*b*), information may be included in the header of the packet of the request to indicate that the request is coming from one of the primary or secondary computing device. For example, the header may include an identifier of either the primary computing device (e.g., the first computing device 206*a*, the first packager 208*a*, and/or the first cache 210*a*) or the secondary computing device (e.g., the second computing device 206*b*, the second packager 208*b*, and/or the second cache 210*b*). For example, the cache (e.g., the first cache 210*a* or the second cache 210*b*) knows if it is the primary or secondary cache for the content distribution and knows how to behave if it receives a request from the corresponding primary or secondary cache (e.g., the corresponding first cache 210*a* or second cache 210*b*). The receiving computing device (e.g., first cache 210*a* or second cache 210*b*) may parse the header and identify the information that indicates that the request is coming from either a primary packager/cache or secondary packager/cache.

At 640, a request for the encryption key data may be generated and sent to a keystore 218 or another repository or other form of storage device where encryption keys, encryption tokens, and/or key metadata associated with the requested content may be stored. For requests for encryption key data received at the first computing device 206*a*, for example, the first computing device 206*a* (e.g., the first packager 208*a*) may generate the request for the encryption key data. The request may be generated in response to determining that the encryption key data is not stored in the first cache 210*a* and that the request for the encryption key data is from the secondary computing device (e.g., the second cache 210*b* or second packager 208*b* of the second computing device 206*b*). For requests for encryption key data received at the second computing device 206*b*, for example, the second computing device 206*b* (e.g., the second packager 208*b* may generate the request for the encryption key data). The request may be generated in response to determining that the encryption key data is not stored in the second cache 210*b* and that the request for the encryption key data is from the secondary computing device (e.g., the first cache 210*a* or first packager 208*a* of the first computing device 206*a*).

The request for the encryption key data may include a content identifier identifying the content. The request for the encryption key data may be sent to the keystore 218 or another repository or other form of storage device where encryption keys, encryption tokens, and/or key metadata associated with the requested content may be stored. For example, the keystore 218 may be located remotely from the first computing device 206*a* and/or the second computing device 206*b*.

At 650, the encryption key data may be received from the keystore 218 or another repository or other form of storage device. The encryption key data may be received in response to the request for the encryption key data being sent to the keystore 218. For requests for encryption key data sent by the first computing device 206*a* (e.g., the first packager 208*a* or the first cache 210*a*) to the keystore 218, for example, the first packager 208*a* (e.g., or first cache 210*a*) may receive the encryption key data from the keystore 218. For requests for encryption key data sent by the second computing device 206*b* (e.g., the second packager 208*b* or the second cache 210*b*) to the keystore 218, for example, the second packager 208*b* (e.g., or second cache 210*b*) may receive the encryption key data from the keystore 218.

At 660, the received encryption key data (e.g., the encryption key and/or key metadata) may be stored for subsequent use. For example, for requests for encryption key data sent by the first computing device 206*a* (e.g., the first packager 208*a* or the first cache 210*a*) to the keystore 218, the first packager 208*a* may store the encryption key data in a first cache 210*a* (e.g., or another repository or other form of storage device local to the first packager 208*a*) associated with the first packager 208*a*. For requests for encryption key data sent by the second computing device 206*b* (e.g., the second packager 208*b* or the second cache 210*b*) to the keystore 218, for example, the second packager 208*b* may store the encryption key data in a second cache 210*b* (e.g., or another repository or other form of storage device local to the second packager 208*b*) associated with the second packager 208*b*. Encrypted content may require per-key DRM metadata that doesn't change over time. Thus, storage of the encryption key and key metadata local to the first computing device 206*a* or the second computing device 206*b* may enable faster delivery of requested content to users.

At 670, the computing device may send the encryption key data (e.g., all or a portion of the encryption key and key metadata) to the other computing device. For example, for requests for encryption key data sent by the first computing device 206*a* (e.g., the first packager 208*a* or the first cache 210*a*) to the keystore 218, the first cache 210*a* (or the first packager 208*a*) may generate and send a reply message to the second computing device (e.g., the second cache 210*b* or second packager 208*b*) that includes all or at least a portion of the encryption key data. For requests for encryption key data sent by the second computing device 206*b* (e.g., the second packager 208*b* or the second cache 210*b*) to the keystore 218, for example, the second cache 210*b* (or the second packager 208*b*) may generate and send a reply message to the first computing device 206*a* (e.g., the first cache 210*a* or first packager 208*a*) that includes all or at least a portion of the encryption key data.

Figure 7:
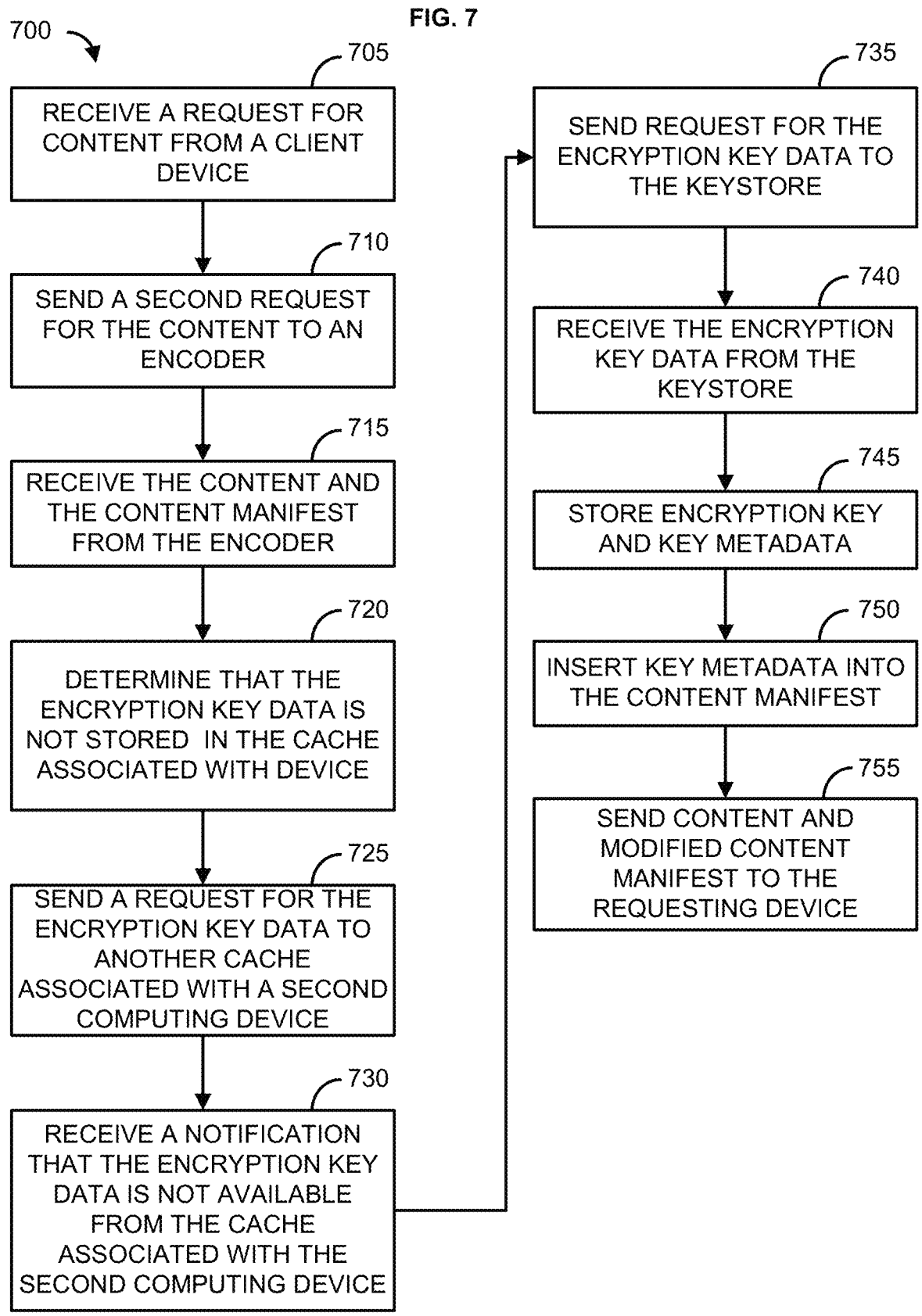
FIG. 7 shows a flowchart of another method for restoring digital rights management data at a computing device.

FIG. 7 is a flowchart of another example method 700 for restoring the synchronization of digital rights management data for requested content in multiple computing devices (e.g., a first computing device 206*a* and a second computing device 206*b*).

At 705, a computing device may receive a request for content from a requesting device (e.g., the user device 216). For example, the computing device receiving the request may be the primary computing device (e.g., the first computing device 206*a*) for providing content to the user device

216. For example, the request for content may include a content identifier identifying the requested content. The requested content may be any one or more of video, audio, games, applications, data, streaming content, movies, shows/programs, etc. For example, the request for content may be a request for a segment of the content. The segment of the content may be a segment other than the first segment of the content. For example, the request for content may include a segment identifier or clock identifying the segment of the content being requested. For example, the request for content may be received by the first packager 208*a* of the first computing device 206*a* from the user device 216 via the network 214 and the content server 212.

At 710, a second request for content may be sent to an encoder associated with the computing device (e.g., the first primary computing device for packaging content for the user device 216). For example, the second request for the content may be generated and sent by the first computing device 206*a* (e.g., the first packager 208*a*) to the first encoder 204*a*. The second request for content may include the content identifier identifying the requested content and a segment identifier or clock identifying the segment of the content being requested. The second request for content may be sent in response to receiving the request for content at the first computing device 206*a*.

At 715, the computing device (e.g., the first primary computing device for packaging content for the user device 216) may receive the requested content and a content manifest file (e.g., or other index file describing portions of the content) from an encoder (e.g., the first encoder 204*a*). For example, the first packager 208*a* of the first computing device 206*a* may receive the requested content and the content manifest file associated with the requested content from the first encoder 204*a* in response to first encoder 204*a* receiving the second request for the content from the first computing device 206*a*. The received content may be compressed based on one or more compression standards, such as MPEG.

At 720, the computing device (e.g., the first primary computing device for packaging content for the user device 216) may determine that encryption key data (e.g., one or more of the encryption key and key metadata) associated with the requested content is not stored in the local cache (e.g., or another repository or other form of storage device). For example, when the first computing device 206*a* is the primary computing device, the first packager 208*a* may send a request to the first cache 210*a* (e.g., or another repository or other form of storage device) for the encryption key data. The first cache 210*a* (or the first packager 208*a*) may evaluate the contents of the first cache 210*a* and determine that the encryption key data is not stored in the first cache 210*a*. The first cache 210*a* may reply with a miss or other response to the first packager 208*a* indicating that the first cache 210*a* does not include the encryption key data associated with the requested content.

At 725, the computing device (e.g., the primary computing device for packaging content for the user device 216) may send a request for the encryption key data to another computing device (e.g., the secondary computing device for packaging content for the user device 216). For example, the first computing device 206*a* (e.g., the first packager 208*a* or the first cache 210*a*) may generate the request for the encryption key data. The request for the encryption key data may include a content identifier identifying the content. The request for the encryption key data may be sent to the second computing device 206*b* (e.g., the second packager 208*b* or the second cache 210*b* (or another repository or other form of storage device associated with the second packager 208*b*)).

At 730, the computing device (e.g., the primary computing device for packaging content for the user device 216) may receive a reply from the other computing device (e.g., the secondary computing device for packaging content for the user device 216) that the encryption key data is not available from the cache (e.g., the second cache 210*b* or another repository or other form of storage device) associated with the other computing device. For example, the first computing device 206*a* (e.g., the first packager 208*a* or the first cache 210*a*) may receive a reply to the request for the encryption key data. The reply may originate from the second computing device 206*b* (e.g., the second packager 208*b* or the second cache 210*b*). The reply may be a miss, a Hyper Text Transfer Protocol (HTTP) 404 response of a file not found, or other response to the first packager 208*a* or first cache 210*a* indicating that the second cache 210*b* does not include the encryption key data associated with the requested content.

At 735, the computing device (e.g., the primary computing device for packaging content for the user device 216) may generate and send a request for the encryption key data to a keystore 218 or another repository or other form of storage device where encryption keys, encryption tokens, and/or key metadata associated with the requested content may be stored. For example, the first computing device 206*a* (e.g., the first packager 208*a*) may generate the request for the encryption key data. The request may be generated in response to determining that the encryption key data is not stored in the first cache 210*a* of the primary computing device 206*a* and the second cache 210*b* of the secondary computing device 206*b*.

The request for the encryption key data may include a content identifier identifying the content. The request for the encryption key data may be sent to the keystore 218 or another repository or other form of storage device where encryption keys, encryption tokens, and/or key metadata associated with the requested content may be stored. For example, the keystore 218 may be located remotely from the first computing device 206*a* and/or the second computing device 206*b*.

At 740, the encryption key data (e.g., the encryption key and/or the key metadata) may be received from the keystore 218 or another repository or other form of storage device. The encryption key data may be received by the primary computing device (e.g., the first computing device 206*a*) in response to the request for the encryption key data being sent to the keystore 218. For example, the first packager 208*a* (e.g., or first cache 210*a*) may receive the encryption key data from the keystore 218.

At 745, the received encryption key data (e.g., the encryption key and/or key metadata) may be stored for subsequent use. For example, the first packager 208*a* may store the encryption key data in the first cache 210*a* (e.g., or another repository or other form of storage device local to the first packager 208*a*) associated with the first packager 208*a*. Encrypted content may require per-key DRM metadata that doesn't change over time. Thus, storage of the encryption key and key metadata local to the primary computing device for packaging content (e.g., the first computing device 206*a*) for the user device 216 may enable faster delivery of requested content to users.

The primary computing device (e.g., the first computing device 206*a* or the second computing device 206*b*) may encrypt the content based on the received encryption key.

The received content may be encrypted based on one or more encryption standards. The encrypted content may require the encryption key and/or all or a portion of the key metadata to be decrypted for display on a user device 216.

At 750, at least a portion of the key metadata may be inserted by the primary computing device (e.g., the first computing device 206a) into the manifest file (e.g., or other index file describing portions of the requested content). For example, the first packager 208a or another portion of the first computing device 206a may insert all or a portion of the key metadata into the manifest file associated with the requested content. For example, the first packager 208a may modify the manifest file by adding one or more of the data indicating what type of encryption key it is, what type of encryption was completed on the content, a timestamp identifying when the encryption key was created, when the encryption key expires, a unique identifier for the encryption key, the content associated with the encryption key, who owns the encryption key and/or what the encryption key is used for from the key metadata.

At 755, the primary computing device (e.g., the first computing device 206a) may send one or more of the content (e.g., encrypted content or a segment of the encrypted content) or the modified manifest file (e.g., or other modified index file describing portions of the content and including at least a portion of the key metadata) to the user device 216. For example, each of the content (e.g., the encrypted content or a segment of the encrypted content) or the modified manifest file (e.g., or other modified index file describing portions of the content and including at least a portion of the key metadata), may be sent by the first packager 208a (or another portion of the first computing device 206a) to the user device 216 via the content server 212 and the network 214. For example, the modified manifest file (e.g., or other modified index file describing portions of the content and including at least a portion of the key metadata) may be sent by the first packager 208a (or another portion of the first computing device 206a) to the user device 216 via the content server 212 and the network 214.

Figure 8:
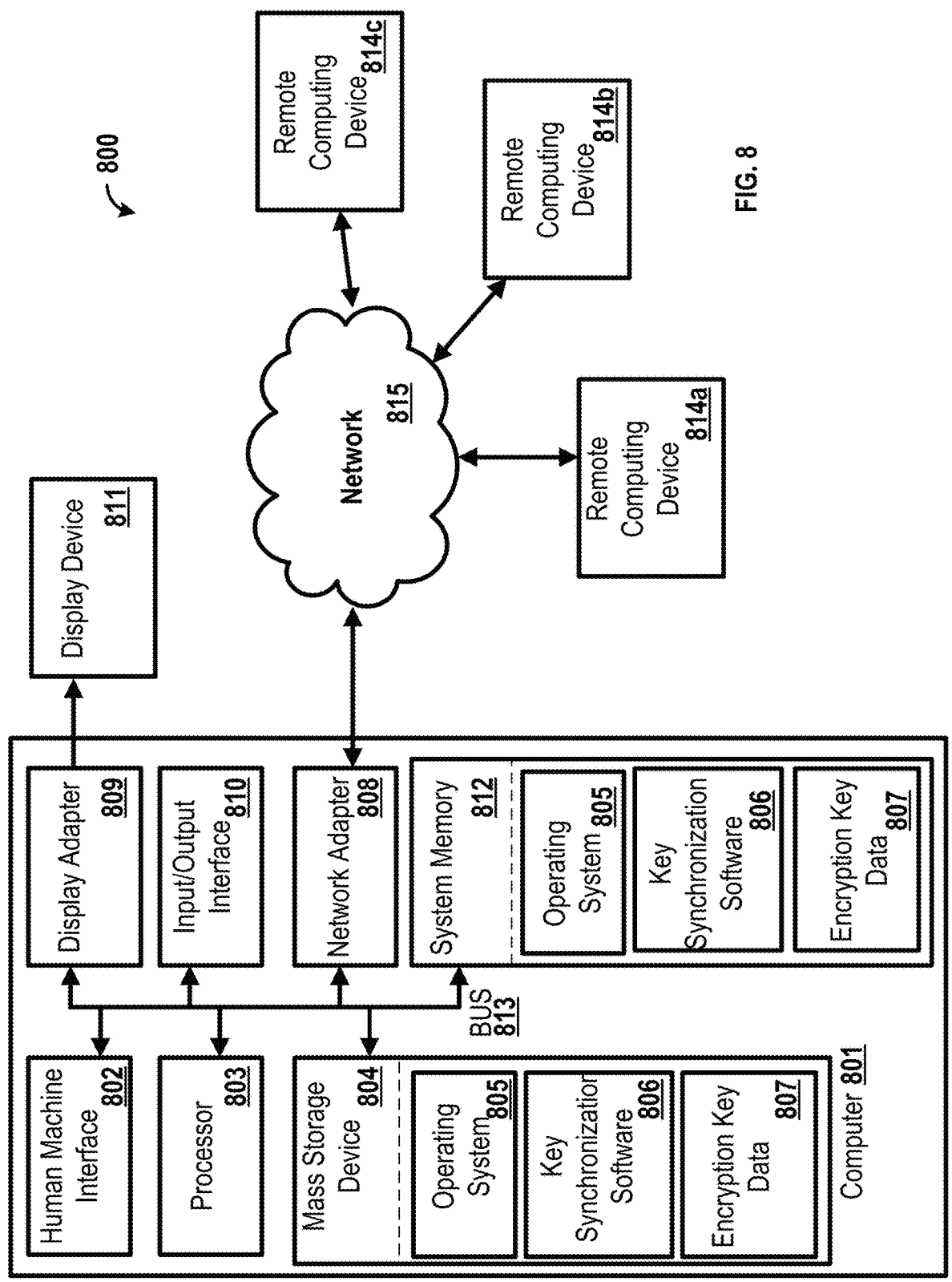
FIG. 8 shows a block diagram of a computing device for implementing a synchronization of digital rights management data.

FIG. 8 shows a system 800 for synchronizing digital rights management across multiple computing devices. Any device/component described herein may be a computer 801 as shown in FIG. 8.

The computer 801 may include one or more processors 803, a system memory 812, and a bus 813 that couples various components of the computer 801 including the one or more processors 803 to the system memory 812. In the case of multiple processors 803, the computer 801 may utilize parallel computing.

The bus 813 may include one or more of several possible types of bus structures, such as a memory bus, memory controller, a peripheral bus, an accelerated graphics port, and a processor or local bus using any of a variety of bus architectures.

The computer 801 may operate on and/or include a variety of computer readable media (e.g., non-transitory). Computer readable media may be any available media that is accessible by the computer 801 and includes, non-transitory, volatile and/or non-volatile media, removable and non-removable media. The system memory 812 has computer readable media in the form of volatile memory, such as random access memory (RAM), and/or non-volatile memory, such as read-only memory (ROM). The system memory 812 may store data such as encryption key data 807 and/or program modules such as an operating system 805 and key synchronization software 806 that are accessible to and/or are operated on by the one or more processors 803.

The computer 801 may also include other removable/non-removable, volatile/non-volatile computer storage media. The mass storage device 804 may provide non-volatile storage of computer code, computer readable instructions, data structures, program modules, and other data for the computer 801. The mass storage device 804 may be a hard disk, a removable magnetic disk, a removable optical disk, magnetic cassettes or other magnetic storage devices, flash memory cards, CD-ROM, digital versatile disks (DVD) or other optical storage, random access memories (RAM), read-only memories (ROM), electrically erasable programmable read-only memory (EEPROM), and the like.

Any number of program modules may be stored on the mass storage device 804. An operating system 805 and key synchronization software 806 may be stored on the mass storage device 804. One or more of the operating system 805 and key synchronization software 806 (or some combination thereof) may include program modules and the key synchronization software 806. Encryption key data 807 may also be stored on the mass storage device 804. The encryption key data 807 may be stored in any of one or more databases known in the art. The databases may be centralized or distributed across multiple locations within the network 815.

A user may enter commands and information into the computer 801 via an input device (not shown). Such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 803 via a human machine interface 802 that is coupled to the bus 813, but may be connected by other interface and bus structures, such as a parallel port, game port, an IEEE 1394 Port (also known as a Firewire port), a serial port, network adapter 808, and/or a universal serial bus (USB).

A display device 811 may also be connected to the bus 813 via an interface, such as a display adapter 809. It is contemplated that the computer 801 may have more than one display adapter 809 and the computer 801 may have more than one display device 811. A display device 811 may be a monitor, an LCD (Liquid Crystal Display), light-emitting diode (LED) display, television, smart lens, smart glass, and/or a projector. In addition to the display device 811, other output peripheral devices may comprise components such as speakers (not shown) and a printer (not shown) which may be connected to the computer 801 via Input/Output Interface 810. Any step and/or result of the methods may be output (or caused to be output) in any form to an output device. Such output may be any form of visual representation, including, but not limited to, textual, graphical, animation, audio, tactile, and the like. The display 811 and computer 801 may be part of one device, or separate devices.

The computer 801 may operate in a networked environment using logical connections to one or more remote computing devices 814a, 814b, 814c. A remote computing device 814a, 814b, 814c may be a personal computer, computing station (e.g., workstation), portable computer (e.g., laptop, mobile phone, tablet device), smart device (e.g., smartphone, smartwatch, activity tracker, smart apparel, smart accessory), security and/or monitoring device, a server, a router, a network computer, a peer device, edge device or other common network nodes, and so on. Logical connections between the computer 801 and a remote computing device 814a, 814b, 814c may be made via a network 815, such as a local area network (LAN) and/or a general wide area network (WAN). Such network connections may be through a network adapter 808. A network adapter 808 may be implemented in both wired and wireless environments. Such networking environments are conventional and commonplace in dwellings, offices, enterprise-wide computer networks, intranets, and the Internet.

Application programs and other executable program components such as the operating system 805 are shown herein as discrete blocks, although it is recognized that such programs and components may reside at various times in different storage components of the computing device 801, and are executed by the one or more processors 803 of the computer 801. An implementation of key synchronization software 806 may be stored on or sent across some form of computer readable media. Any of the disclosed methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. One or more non-transitory computer-readable media storing processor-executable instructions that, when executed by at least one processor, cause the at least one processor to:
   receive a request for content;
   send a second request for the content to an encoder;
   receive, based on the second request, the content and a content manifest;
   determine that encryption key data for the content is not in a cache associated with a computing device; and
   send, based on the determination that the encryption key data is not in the cache, a request for the encryption key data to a cache associated with a second computing device.

2. The one or more non-transitory computer-readable media of claim 1, wherein the processor-executable instructions, when executed by the at least one processor, further cause the at least one processor to:
   receive, from the cache associated with the second computing device, the encryption key data; and
   modify the content manifest to include at least a portion of the encryption key data.

3. The one or more non-transitory computer-readable media of claim 2, wherein the processor-executable instructions, when executed by the at least one processor, further cause the at least one processor to store the encryption key data in the cache associated with the computing device.

4. The one or more non-transitory computer-readable media of claim 2, wherein the processor-executable instructions, when executed by the at least one processor, further cause the at least one processor to send the modified content manifest to a requesting device.

5. The one or more non-transitory computer-readable media of claim 1, wherein the processor-executable instructions that, when executed by the at least one processor, cause the at least one processor to send the request for the encryption key data, cause the at least one processor to send a request for one or more of an encryption key or key metadata to the cache associated with the second computing device.

6. The one or more non-transitory computer-readable media of claim 1, wherein the processor-executable instructions that, when executed by the at least one processor, cause the at least one processor to determine that the encryption key data is not in the cache associated with the computing device, cause the at least one processor to determine that one or more of an encryption key or key metadata are not stored in the cache associated with the computing device.

7. The one or more non-transitory computer-readable media of claim 1, wherein the computing device comprises a content packager.

8. The one or more non-transitory computer-readable media of claim 1, wherein the processor-executable instructions, when executed by the at least one processor, further cause the at least one processor to encrypt, based on the encryption key data, the content.

9. The one or more non-transitory computer-readable media of claim 1, wherein the processor-executable instructions, when executed by the at least one processor, further cause the at least one processor to:
   receive, based on sending the request for the encryption key data, an indication that the encryption key data is not stored in the cache associated with the second computing device; and
   receive, based on a request to a keystore, the encryption key data from the keystore.

10. The one or more non-transitory computer-readable media of claim 9, wherein the processor-executable instructions, when executed by the at least one processor, further cause the at least one processor to:
    store the encryption key data in the cache associated with the computing device; and
    send the encryption key data and the content manifest to a requesting device.

11. A system comprising:
    a first computing device configured to:
      receive a request for content;
      send a second request for the content to an encoder;
      receive, based on the second request, the content and a content manifest;
      determine that encryption key data for the content is not in a cache associated with the first computing device; and
      send, based on the determination that the encryption key data is not in the cache, a request for the encryption key data to a cache associated with a second computing device; and
    a user device configured to:
      send the request for the content.

12. The system of claim 11, wherein the first computing device is further configured to:
receive, from the cache associated with the second computing device, the encryption key data; and
modify the content manifest to include at least a portion of the encryption key data.

13. The system of claim 12, wherein the first computing device is further configured to store the encryption key data in the cache associated with the first computing device.

14. The system of claim 12, wherein the first computing device is further configured to send the modified content manifest to a requesting device.

15. The system of claim 11, wherein to send the request for the encryption key data, the first computing device is configured to send a request for one or more of an encryption key or key metadata to the cache associated with the second computing device.

16. The system of claim 11, wherein to determine that the encryption key data is not in the cache associated with the first computing device, the first computing device is configured to determine that one or more of an encryption key or key metadata are not stored in the cache associated with the first computing device.

17. The system of claim 11, wherein the first computing device comprises a content packager.

18. The system of claim 11, wherein the first computing device is further configured to encrypt, based on the encryption key data, the content.

19. The system of claim 11, wherein the first computing device is further configured to:
receive, based on sending the request for the encryption key data, an indication that the encryption key data is not stored in the cache associated with the second computing device; and
receive, based on a request to a keystore, the encryption key data from the keystore.

20. The system of claim 19, wherein the first computing device is further configured to:
store the encryption key data in the cache associated with the first computing device; and
send the encryption key data and the content manifest to a requesting device.

21. One or more non-transitory computer-readable media storing processor-executable instructions that, when executed by at least one processor, cause the at least one processor to:
receive a request for content;
receive the requested content and a content manifest;
determine that encryption key data associated with the content is not in a cache associated with a content packaging device;
send, based on the determination that the encryption key data is not in the cache, a request for the encryption key data associated with the content to a cache associated with a second content packaging device;
receive the encryption key data associated with the content from the cache associated with the second content packaging device; and
store the encryption key data associated with the content in the cache associated with the content packaging device.

22. The one or more non-transitory computer-readable media of claim 21, wherein the processor-executable instructions, when executed by the at least one processor, further cause the at least one processor to:
modify the content manifest to include a portion of the encryption key data; and
send the modified content manifest to a requesting device.

23. The one or more non-transitory computer-readable media of claim 22, wherein the processor-executable instructions, when executed by the at least one processor, further cause the at least one processor to send the requested content to the requesting device.

24. The one or more non-transitory computer-readable media of claim 22, wherein the encryption key data comprises an encryption key and key metadata, and wherein the processor-executable instructions that, when executed by the at least one processor, cause the at least one processor to modify the content manifest to include the portion of the encryption key data, cause the at least one processor to insert at least a portion of the key metadata into the content manifest.

25. The one or more non-transitory computer-readable media of claim 21, wherein the processor-executable instructions that, when executed by the at least one processor, cause the at least one processor to determine that the encryption key data associated with the content is not in the cache associated with the content packaging device, cause the at least one processor to:
send a request to the cache for the encryption key data associated with the content; and
receive, from the cache, a response that the encryption key data associated with the response is not in the cache.

26. A system comprising:
a first content packaging device configured to:
receive a request for content;
receive the requested content and a content manifest;
determine that encryption key data associated with the content is not in a cache associated with the first content packaging device;
send, based on the determination that the encryption key data is not in the cache, a request for the encryption key data associated with the content to a cache associated with a second content packaging device;
receive the encryption key data associated with the content from the cache associated with the second content packaging device; and
store the encryption key data associated with the content in the cache associated with the first content packaging device; and
a user device configured to:
send the request for the content.

27. The system of claim 26, wherein the first content packaging device is further configured to:
modify the content manifest to include a portion of the encryption key data; and
send the modified content manifest to a requesting device.

28. The system of claim 27, wherein the first content packaging device is further configured to send the requested content to the requesting device.

29. The system of claim 27, wherein the encryption key data comprises an encryption key and key metadata, and wherein to modify the content manifest to include the portion of the encryption key data, the first content packaging device is configured to insert at least a portion of the key metadata into the content manifest.

30. The system of claim 26, wherein to determine that the encryption key data associated with the content is not in the cache associated with the first content packaging device, the first content packaging device is configured to:
send a request to the cache for the encryption key data associated with the content; and receive, from the cache, a response that the encryption key data associated with the response is not in the cache.

\* \* \* \* \*